United States Patent
Fujita

(10) Patent No.: US 10,415,531 B2
(45) Date of Patent: Sep. 17, 2019

(54) ENGINE STARTER WITH TORQUE VARIATOR

(71) Applicant: DENSO CORPORATION, Kariya, Aichi-pref. (JP)

(72) Inventor: Tatsuya Fujita, Obu (JP)

(73) Assignee: DENSO CORPORATION, Kariya (JP)

( * ) Notice: Subject to any disclaimer, the term of this patent is extended or adjusted under 35 U.S.C. 154(b) by 705 days.

(21) Appl. No.: 14/666,751

(22) Filed: Mar. 24, 2015

(65) Prior Publication Data

US 2015/0275842 A1 Oct. 1, 2015

(30) Foreign Application Priority Data

Mar. 26, 2014 (JP) .................................. 2014-063814
May 29, 2014 (JP) .................................. 2014-111310

(51) Int. Cl.
| | |
|---|---|
| *F16H 48/11* | (2012.01) |
| *F02N 15/04* | (2006.01) |
| *F16H 3/72* | (2006.01) |
| *F16H 3/74* | (2006.01) |
| *F02N 11/00* | (2006.01) |
| *F02N 15/02* | (2006.01) |
| *F02N 15/06* | (2006.01) |

(52) U.S. Cl.
CPC .......... *F02N 15/046* (2013.01); *F16H 3/725* (2013.01); *F16H 3/74* (2013.01); *F02N 11/00* (2013.01); *F02N 15/025* (2013.01); *F02N 15/067* (2013.01); *F02N 2300/104* (2013.01); *F16H 2200/203* (2013.01); *F16H 2200/2005* (2013.01); *F16H 2200/2066* (2013.01); *F16H 2200/2082* (2013.01); *Y10T 74/137* (2015.01)

(58) Field of Classification Search
CPC .......................... F02N 15/046; F16H 2200/20
USPC .......................................................... 74/7 E
See application file for complete search history.

(56) References Cited

U.S. PATENT DOCUMENTS

| | | | | |
|---|---|---|---|---|
| 5,743,139 A | * | 4/1998 | Murata | ............... F02N 15/046 475/331 |
| 6,109,122 A | * | 8/2000 | Bori | ............... F02N 15/046 188/82.2 |
| 2003/0094317 A1 | * | 5/2003 | Takizawa | ............... B60K 6/365 180/53.8 |
| 2004/0093967 A1 | | 5/2004 | Shiga et al. | |
| 2010/0269631 A1 | * | 10/2010 | Niimi | ............... B60W 10/06 74/7 E |

FOREIGN PATENT DOCUMENTS

| | | |
|---|---|---|
| JP | S61-39481 A | 2/1986 |
| JP | 2004-218627 A | 8/2004 |

* cited by examiner

*Primary Examiner* — William C Joyce
*Assistant Examiner* — Randell J Krug
(74) *Attorney, Agent, or Firm* — Oliff PLC

(57) ABSTRACT

A starter for an engine is equipped with a planetary gear train as a torque variator to change torque used to start the engine. The torque variator is capable of changing the degree of torque which is transmitted between a planetary carrier and an outer gear of the planetary gear train, thereby changing a ratio of speed of a sun gear to speed of the planetary carrier of the planetary gear train to increase or decrease the degree of torque required to start the engine. This ensures the stability in starting the engine, for example, in cold conditions and achieves a quick start of the engine as needed.

17 Claims, 21 Drawing Sheets

AXIAL DIRECTION

DIRECTION OF MOTOR ROTATION

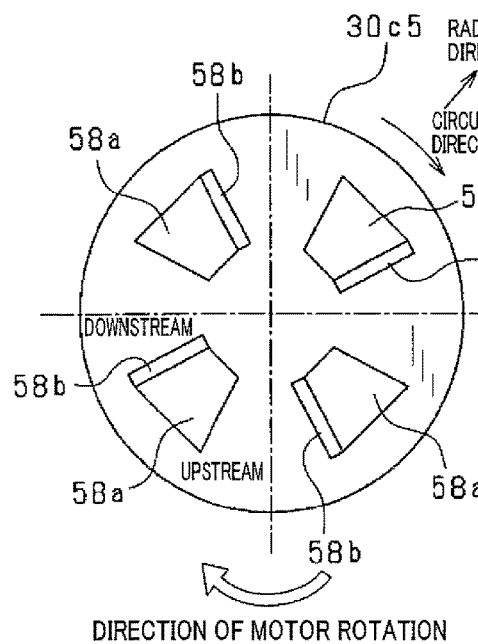 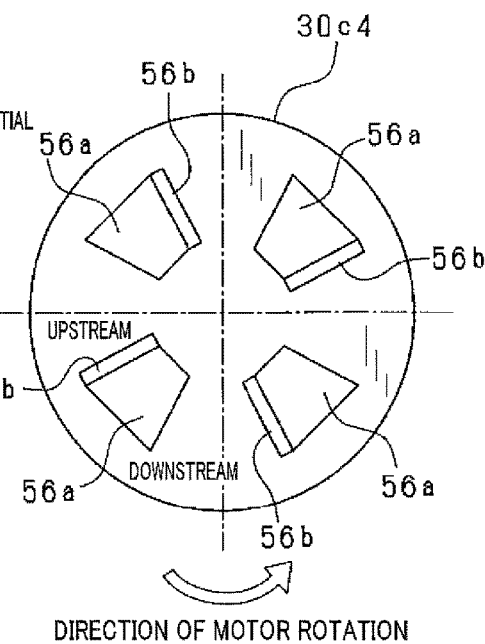
FIG.13(a)  FIG.13(b)
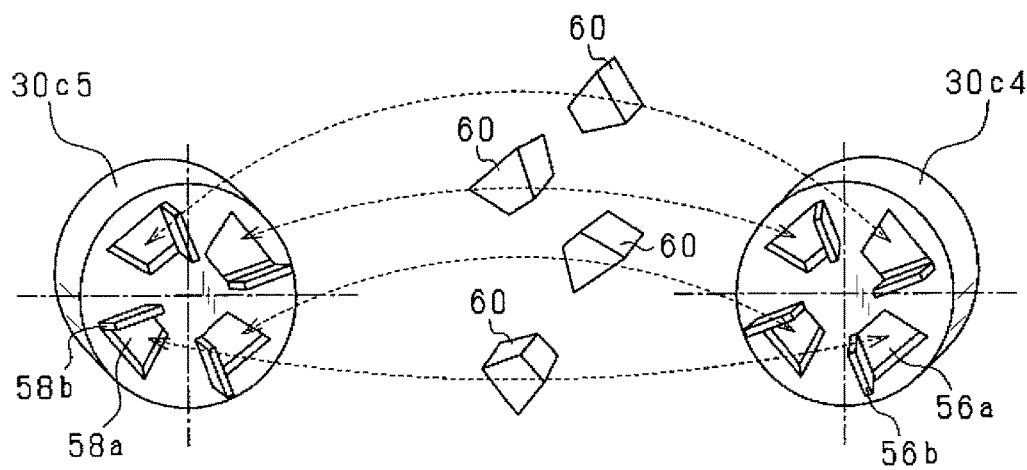
FIG.14

DIRECTION OF MOTOR ROTATION

ENGINE STARTER WITH TORQUE VARIATOR

CROSS REFERENCE TO RELATED DOCUMENT

The present application claims the benefit of priority of Japanese Patent Application No. 2014-63814 filed on Mar. 26, 2014 and No. 2014-111310 filed on May 29, 2014, disclosures of which are incorporated herein by reference.

BACKGROUND OF THE INVENTION

1 Technical Field

This disclosure relates generally to an engine starter designed to apply torque to a ring gear of an engine.

2 Background Art

There is a need to rotate a pinion gear of a starter at high speed to shorten the time required to start an internal combustion engine. When the pinion gear is rotated at high speed, it requires an electric motor of the starter to be increased in size in order to produce a degree of torque great enough to start the engine in cold conditions.

In order to meet the above requirement, Japanese Patent First Publication No. 2004-218627 proposes a starter which is designed to change a speed reduction ratio of an output shaft of an electric motor to a pinion gear of the starter and works to increase the speed reduction ratio to elevate torque outputted from the electric motor as needed. Specifically, the starter is equipped with a planetary gear train, a cam mechanism, and a housing in which the planetary gear train and the cam mechanism are installed. The planetary gear train includes a sun gear joined to an output shaft of an electric motor, planet gears meshing with the sun gear, an internal gear meshing with the planet gears, and a carrier training the planet gears to be rotatable. The cam mechanism consists of a stationary cam plate secured to the internal gear, a movable cam plate facing the stationary cam plate, balls disposed to be rollable in cam grooves formed in the stationary and movable cam plates, and an elastic member urging the movable cam plate into constant contact with the stationary cam plate.

The electric motor of the starter outputs a small degree of torque until the pinion gear meshes with the ring gear of the internal combustion engine, so that the movable cam plate is kept pressed against the stationary cam plate. This causes an inner peripheral tapered surface of the movable cam plate to be pressed against an outer periphery of an outer cam joined to the pinion gear, so that the outer cam and the internal gear are fixed, thereby establishing a gear reduction ratio of one in the planetary gear train.

Afterwards, the pinion gear meshes with the ring gear. The electric motor is then required to increase the output torque for rotating the ring gear. The movable cam plate is disengaged from the stationary cam plate, so that the outer periphery of the outer cam is separated from the inner peripheral tapered surface of the movable cam plate, and an outer peripheral tapered surface of the movable cam plate is pressed against a tapered surface of the housing. This holds the internal gear from rotating and results in an increased reduction speed ratio in the planetary gear train.

The above starter encounters the following drawback. When the starter is required to achieve a high speed reduction ratio, but, the movable cam plate has failed to establish engagement with the housing through pressurized contact between the outer peripheral tapered surface of the movable cam plate and the inner peripheral tapered surface of the housing, there is a probability that the internal gear rotates in a direction opposite to rotation of the sun gear, thus resulting in a failure in transmitting torque outputted from the motor to the pinion gear to start the engine. Additionally, when a depth of engagement of the pinion gear and the ring gear is small when the pinion is rotated in high speed, it may result in breakage of the pinon gear or the ring gear.

SUMMARY OF THE INVENTION

It is therefore an object of this disclosure to provide an engine starter which is designed to eliminate the above problem and ensures the stability in starting an engine.

According to one aspect of the invention, there is provided a starter for an engine such as an internal combustion engine for automotive vehicles. The starter comprises: (a) a motor which works to produce torque when electrically energized; (b) a planetary gear train which includes a sun gear installed on an output shaft of the motor, planet gears meshing with the sun gear, an outer gear meshing with the planet gears, and a planetary carrier retaining the planet gears to be rotatable, the planetary gear train being responsive to input of the torque produced by the motor to output torque from the planetary carrier; (c) a pinion gear which meshes with a ring gear of an engine and works to transmit the torque, as outputted from the planetary carrier, to the ring gear to start the engine; (d) a torque variator which works to vary a degree of the torque transmitted from the outer gear to the planetary carrier; and (e) a one-way clutch which permits the outer gear to rotate in a first direction in which the sun gear rotates when the motor rotates to exert the torque on the ring gear for starting the engine and inhibits the outer gear from rotating in a second direction opposite the first direction.

Specifically, the starter is equipped with the torque variator which is capable of producing a degree of torque which is transmitted between the planetary carrier and the outer gear and causes the planetary carrier and the outer gear to rotate together. In other words, the planetary carrier and the outer gear are fastened or locked together, so that a ratio (i.e., the speed reduction ratio) of speed of the sun gear to speed of the planetary carrier is one. This quickly increases the speed of the ring gear coupled to the crankshaft of the engine up to a value which causes the engine to be fired, thereby improving the startability of the engine.

The torque variator is also capable of increasing the degree of torque transmitted between the planetary carrier and the outer gear up to a value which releases the locking between the planetary carrier and the outer gear. This causes the sun gear to be driven by the motor so that the planet gears rotate. The outer gear is urged by the rotation of the planet gears to rotate in a direction opposite a direction in which the sun gear rotates. Such rotation of the outer gear is, however, stopped by the one-way clutch, thereby achieving a speed reduction ratio greater than one in the planetary gear train. This results in an increase in torque to be applied from the pinion gear to the ring gear, thereby ensuring the stability in starting the engine, for example, in cold conditions.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIGS. 13(a) and 13(b) are views which illustrate a torque transmitting mechanism of the torque variator of FIG. 12;

FIG. 14 is an exploded perspective view which illustrate rubber members installed in the torque transmitting mechanism of FIGS. 13(a) and 13(b);

DESCRIPTION OF THE PREFERRED EMBODIMENTS

First Embodiment

Figure 1:
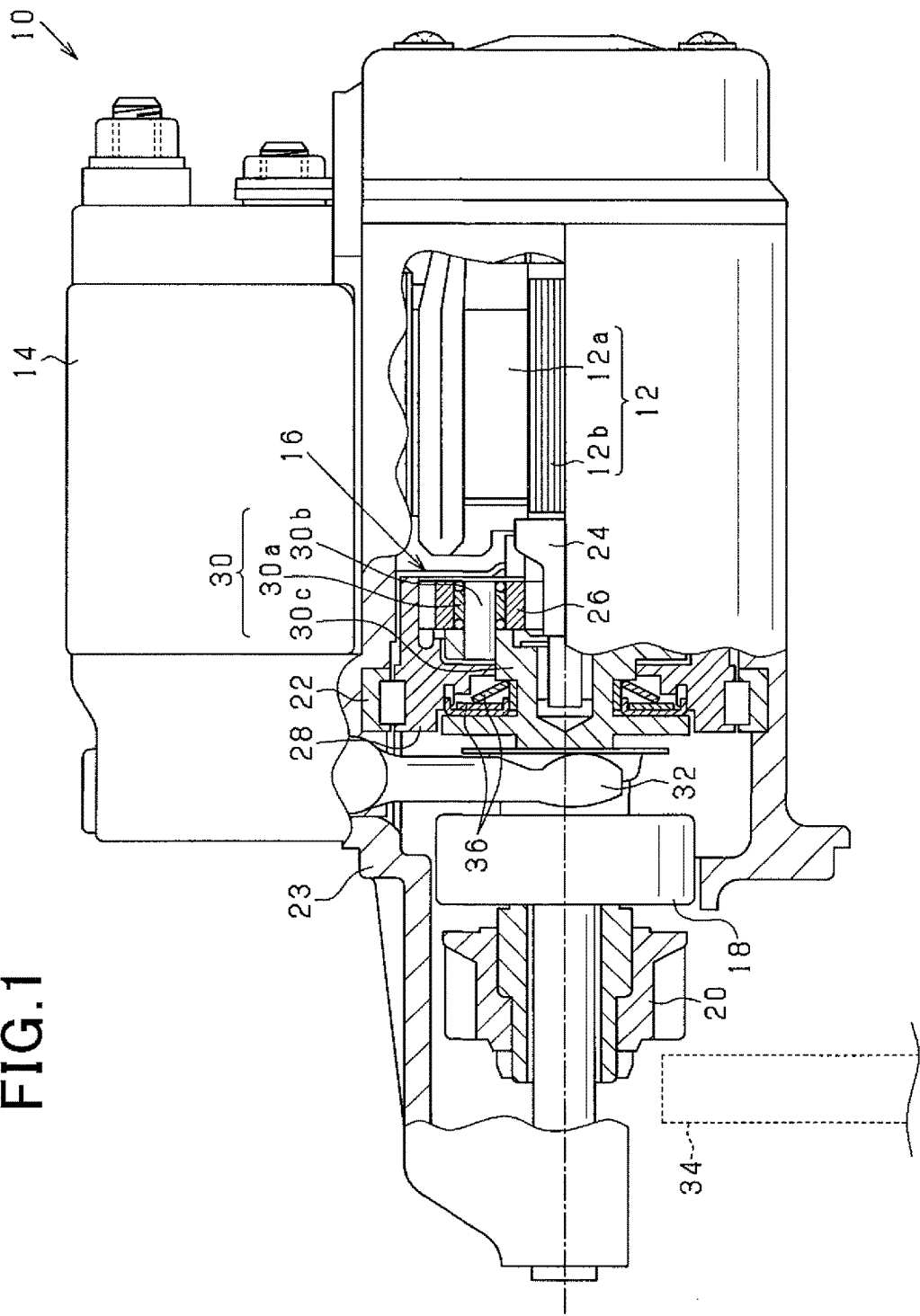
FIG. 1 is a partially cross sectional view which shows the structure of a starter for an engine according to the first embodiment.
Figure 2:
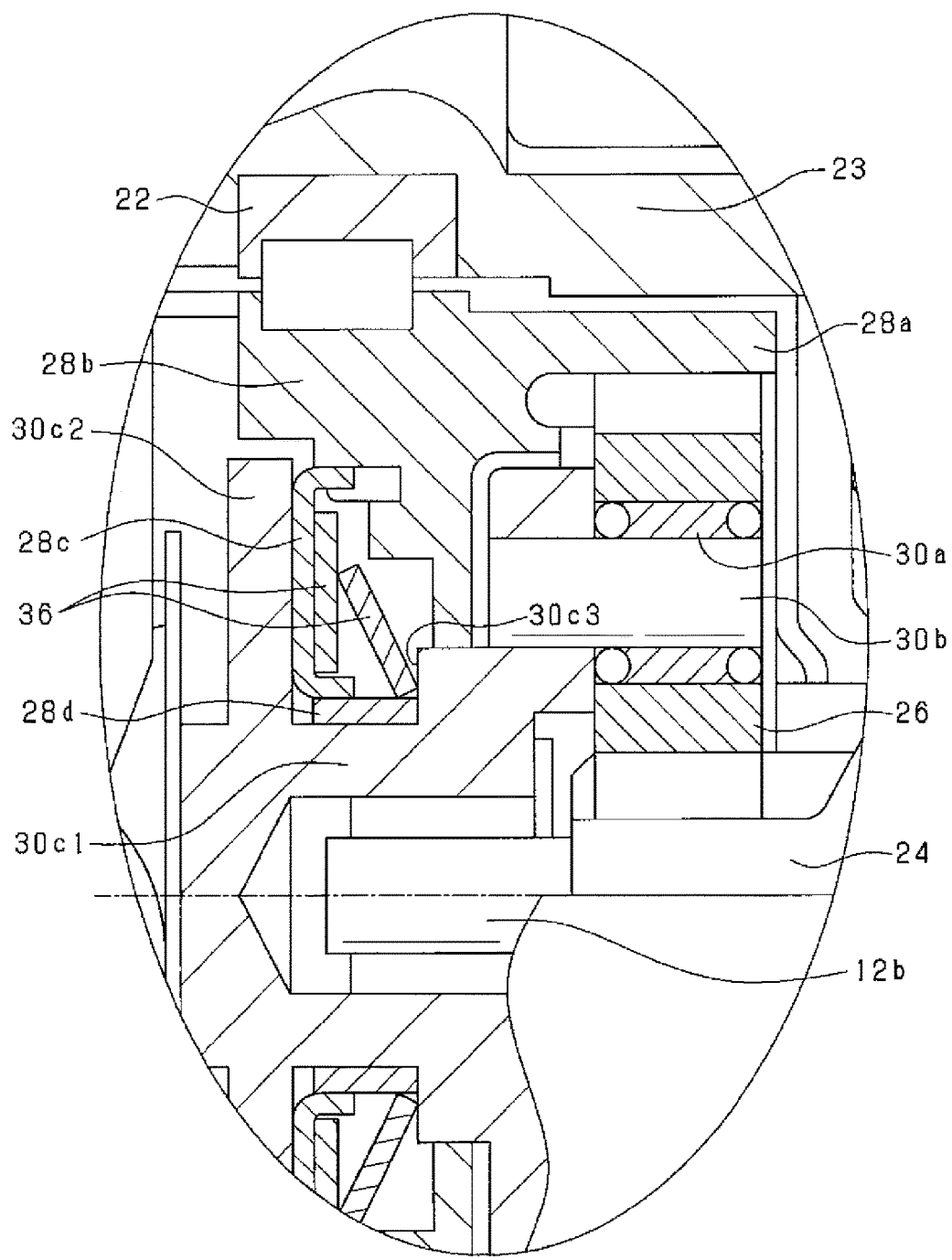
FIG. 2 is a partially enlarged view of FIG. 1.

Referring to the drawings, wherein like reference numbers refer to like parts in several views, particularly to FIGS. 1 and 2, there is shown a starter 10 for an engine such as an automotive internal combustion engine according to the first embodiment.

The starter 10 includes an electric motor 12, a magnet switch 14, a planetary gear train 16, an overrunning clutch 18, a pinion gear 20, an one-way clutch 22, and a housing 22. The electric motor 12 works to produce torque. The magnet switch 14 controls an on-off operation of the electric motor 12. The overrunning clutch 18 is connected to an output of the planetary gear train 16. The pinion gear 20 works to output torque, as transmitted from the planetary gear train 16 through the overrunning clutch 18. The housing 23 stores the above components therein.

The magnet switch 14 is equipped with an exciting coil (not shown) and a plunger (not shown) disposed to be slidable within the exciting coil. The exciting coil is supplied with electric current from a storage battery mounted outside the starter 10 upon turning on of a starter switch by an operator. When energized, the exciting coil generates a magnetic attraction to move the plunger to bring a pair of moving contacts into electric contact with a stationary contact, thereby closing a power supply circuit from the battery to the electric motor 12.

The electric motor 12 is a known dc electric motor equipped with an armature 12a and an armature shaft 12b working as a rotating shaft of the armature 12a. When the magnetic switch 14 is turned on, so that the power supply circuit is closed, the armature 12a is supplied with electricity from the battery, so that it produces torque to rotate the armature shaft 12b.

The planetary gear train 16 is equipped with a sun gear 24, a plurality of planet gears 26 (three planet gears 26 in this embodiment) that are external tooth gears meshing with the sun gear 24, an outer gear 28 meshing with the planet gears 26, and a planetary carrier 30 which retains the planet gears 26 to be rotatable. The sun gear 24 is an external tooth gear installed on the top of the armature shaft 12b. The planetary gear train 16 is typically engineered so as to have rotating speeds of the sun gear 24, the planet gears 30, and the outer gear 28 lie on a straight line in this order in a nomographic chart.

The planetary carrier 30 is equipped with sliding bearings 30a, pins 30b which support the planet gears 26 to be rotatable through the bearings 30a, and a carrier shaft 30c which retains the pins 30b. The carrier shaft 30c, as illustrated in FIG. 2, includes a cylindrical center shaft 30c1 and a disc or flange 30c2. The cylindrical center shaft 30c1 connects with the pins 30b and is disposed along the center axis of the planetary carrier 30. The flange 30c2 serves as a contacting member which will also be referred to as a carrier side contacting portion below. The armature shaft 12b, the sun gear 24, the planetary carrier 30 (i.e., the carrier shaft 30c), and the outer gear 28 are coaxially disposed to have center axes arranged in alignment with each other. The planet gears 26 are arranged at equal intervals away from each other on a circle which has a given radius and is centered at the center axis of the carrier shaft 30c on a plane extending perpendicular to the center axis of the carrier shaft 30*c*. Specifically, the three planet gears 26 are arranged in a circle at an interval of 120° away from each other.

The housing 23 has installed therein the one-way clutch 22 which faces the outer gear 28. The one-way clutch 22 permits the outer gear 28 to rotate in a direction (which will also be referred to as a normal direction below) in which the sun gear 24 rotates while the motor 12 is rotating and inhibits the outer gear 28 from rotating in a reverse direction opposite the normal direction. Note that the normal direction and the reverse direction will also be referred to as a first direction and a second direction, respectively.

The overrunning clutch 18 permits torque inputted thereto only in a direction in which the carrier shaft 30*c* serves to start the engine to be transmitted to the pinion gear 20 and runs idle to block torque in the opposite direction (i.e., direction in which engine torque rotates the carrier shaft 30*c*). To an inner race that is an input of the overrunning clutch 18, the carrier shaft 30*c* is connected. To an outer race that is an output of the overrunning clutch 18, the pinion gear 20 is connected. The output of the overrunning clutch 18 and the pinion gear 20 rotate together. The overrunning clutch 18 is movable in a direction of the above center axis (i.e., the center axis of the carrier shaft 30*c* which will also be referred to below as an axial direction) in response to movement of the lever 32 driven by the plunger of the magnet switch 14.

The outer gear 28 includes an annular toothed portion 28*a* and a clutch contacting portion 28*b*. The toothed portion 28*a* is hollow cylindrical and has formed on an inner periphery thereof an inner teeth gear which meshes with the planet gears 26. The clutch contacting portion 28*b* is also hollow cylindrical and located closer to the pinion gear 20 than the toothed portion 28*a* is in the axial direction. The clutch contacting portion 28*b* is disposed to have an outer periphery placed in contact with rollers of the one-way clutch 22.

The clutch contacting portion 28*b* has disposed inside the inner periphery thereof an outer gear side contacting portion 28*c* which inwardly extends from the clutch contacting portion 28*b* toward the center axis of the carrier shaft 30*c* (i.e., the planetary gear train 16). The outer gear side contacting portion 28*c* is made of an annular plate centered at the center axis of the carrier shaft 30*c*. The outer gear side contacting portion 28*c* has a given thickness with opposed major surfaces which will also be referred to below as a first and a second surface. The first surface has an annular sliding surface on which an annular sliding surface of the carrier flange 30*c*2 of the carrier shaft 30*c* slides. Specifically, the annular sliding is centered at the center axis of the outer gear 28 and extends perpendicular to the center axis of the outer gear 28 and on which the carrier side contacting portion (i.e., the carrier flange 30*c*2) is slidable. The second surface of the outer gear side contacting portion 28*c* has formed thereon a spring seat on which a spring mechanism 36 serving as a pressing member rides. The structure of the spring mechanism 36 will be described later in detail. The spring seat is defined by bending an outer and an inner edge of the outer gear side contacting portion 28*c* toward the motor 12 in the axial direction of the carrier shaft 30*c*. The carrier side contacting portion (i.e., the carrier flange 30*c*2) has an annular sliding surface which is centered at the center axis of the planetary carrier 30 and extends perpendicular to the center axis of the planetary carrier 30 and on which the outer gear side contacting portion (i.e., the carrier flange 30*c*2) is slidable. The pressing member (i.e., the spring mechanism 36) presses the annular sliding surface of the outer gear side contacting portion 28*c* against the annular sliding surface of the carrier side contacting portion (i.e., the carrier flange 30*c*2).

The outer gear side contacting portion 28*c*, the carrier flange 30*c*2 (i.e., the carrier side contacting portion), and the spring mechanism 36 constitute a torque variator which works to vary the torque transmitted from the outer gear 28 to the planetary carrier 30.

An outer gear support 28*d* is disposed inside the outer gear side contacting portion 28*c*. The outer gear support 28*d* extends from the outer gear side contacting portion 28*c* toward the motor 12 in the axial direction of the carrier shaft 30*c*. The outer gear support 28*d* is of a hollow cylindrical shape and works to retain the outer gear 28 on the periphery of the center shaft 30*c*1 to be rotatable.

The toothed portion 28*a* and the clutch contacting portion 28*b* are formed by machining or cutting a one-piece metallic member to complete the outer gear 28. The outer gear side contacting portion 28*c* and the outer gear support 28*d* are made of members separate from the outer gear 28. The outer gear 28, the outer gear side contacting portion 28*c*, and the outer gear support 28*d* are assembled into a unit.

The center shaft 30*c*1 is arranged to have the center axis (i.e., a longitudinal center line) thereof extending in alignment with the center axis of the planetary carrier 30. The center shaft 30*c*1 retains therein the top of the armature shaft 12*b* to be rotatable. The carrier flange 30*c*2 of the carrier shaft 30*c* is made of a disc member extending outwardly from the center shaft 30*c*1 in a direction perpendicular to the axial direction of the carrier shaft 30*c*. The carrier flange 30*c*2 is located closer to the pinion gear 20 than the outer gear side contacting portion 28*c* is in the axial direction of the carrier shaft 30*c*. The carrier flange 30*c*2 has opposed major surfaces. One of these surfaces which faces the outer gear side contacting portion 28*c* has an annular sliding surface on which the sliding surface of the outer gear side contacting portion 28*c* is slidable.

The center shaft 30*c*1 has a shoulder 30*c*3 extending perpendicular to the axial direction of the carrier shaft 30*c*. The shoulder 30*c*2 is located closer to the motor 12 than a portion of the center shaft 30*c*1 which contacts the outer gear support 28*d* is. The carrier shaft 30*c* has formed in the outer periphery thereof between the carrier flange 30*c*2 and the shoulder 30*c*3 an annular groove in which the outer gear support 28*d* is disposed.

The outer gear 28, the outer gear side contacting portion 28*c*, the outer gear support 28*d*, and the center shaft 30*c*1 define an annular chamber inside the inner periphery of the outer gear 28. In other words, the center shaft 30*c*1 and the outer gear side contacting portion 28*c* are disposed inside the inner circumference of the outer gear 28 so as to define the annular chamber closed by the center shaft 30*c*1, the outer gear 28, and the outer gear side contacting portion 28*c*. The annular chamber is centered at the center axis of the carrier shaft 30*c* and has the spring mechanism 36 installed therein. The spring mechanism 36 is made up of, for example, disc springs placed in contact with the second surface of the outer gear side contacting portion 28*c* and the shoulder 30*c*3. The spring mechanism 36 is compressed to produce spring pressure to bring the outer gear side contacting portion 28*c* into constant abutment with the carrier flange 30*c*2. Specifically, the spring mechanism 36 is implemented by an elastically deformable member which is disposed in a compressed state in the annular chamber and works to exert a restoring force resulting from the compression thereof on the center shaft 30*c*1 and the outer gear side contacting portion 28*c* to press the annular sliding surface of the outer gear side contacting portion 28c against the annular sliding surface of the carrier side contacting portion (i.e., the carrier flange 30c2).

The center shaft 30c1 and the carrier flange 30c2 are made of a one-piece member to form the carrier shaft 30c, but may alternatively be formed as an assembly of discrete members joined mechanically.

Figure 3A:
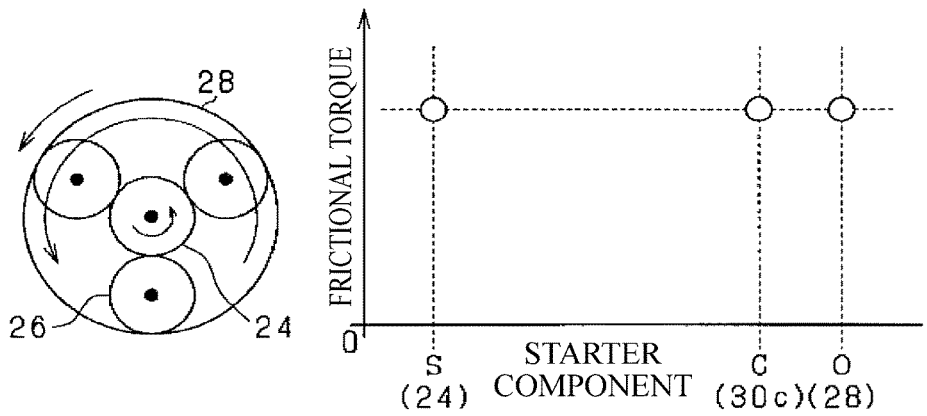
FIGS. 3(a), 3(b), and 3(c) are nomographic charts which represent operations of a planetary gear train installed in the starter of FIG. 1.

The operation of the starter 10 will be described below with reference to FIGS. 3(a), 3(b), and 3(c). In the nomographic chart in each of FIGS. 3(a) to 3(c), "S" represents the sun gear 24. "C" represents the carrier shaft 30c. "O" represents the outer gear 28.

When the starter switch is turned on, the pinion gear 20 is pushed toward the ring gear 34, and the motor 12 is turned on. The nomographic chart of FIG. 3(a) indicates an example where the torque acting on the carrier shaft 30c is lower than non-slip torque when the pinion gear 20 is rotated. The non-slip torque is frictional torque which occurs or acts on a surface of contact between the outer gear side contacting portion 28c and the carrier flange 30c2 when the motor 12 is rotating and depends upon the pressure exerted by the spring mechanism 36 on the surface of contact. In the example FIG. 3(a), the planet gears 26 are stopped from rotating. The rotation of the outer gear 28 is not stopped by the one-way clutch 22. This causes the sun gear 24, the carrier shaft 30c, and the outer gear 28 to rotate together, so that the speed reduction ratio of the planetary gear train 16 is one, that is, the speed of the pinion gear 20 is equal to that of the armature shaft 12b.

Figure 3B:
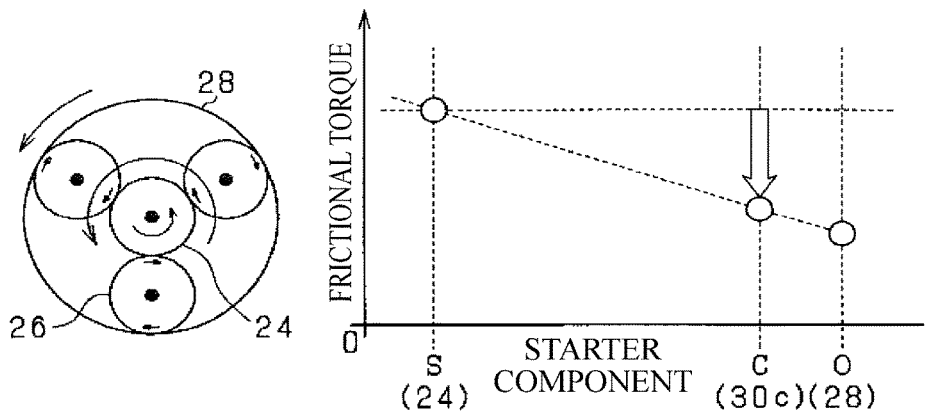

The nomographic chart of FIG. 3(b) indicates an example where the torque acting on the carrier shaft 30c exceeds the non-slip torque. The frictional torque between the carrier flange 30c2 and the outer gear side contacting portion 28c gradually decreases to permit the outer gear side contacting portion 28c to slide on the carrier flange 30c2. In other words, the outer gear side contacting portion 28c is permitted to rotate relative to the carrier flange 30c2, so that the planet gears 26 start rotating. This causes the speeds of the planetary carrier 30 and the outer gear 28 to drop relative to that of the sun gear 24, so that the speed reduction ratio of the planetary gear train 16 starts increasing from one. In the example of FIG. 3(b), the outer gear 28 is rotating in the normal direction, that is, the outer gear 28 is not stopped by the one-way clutch 22 from rotating.

Figure 3C:
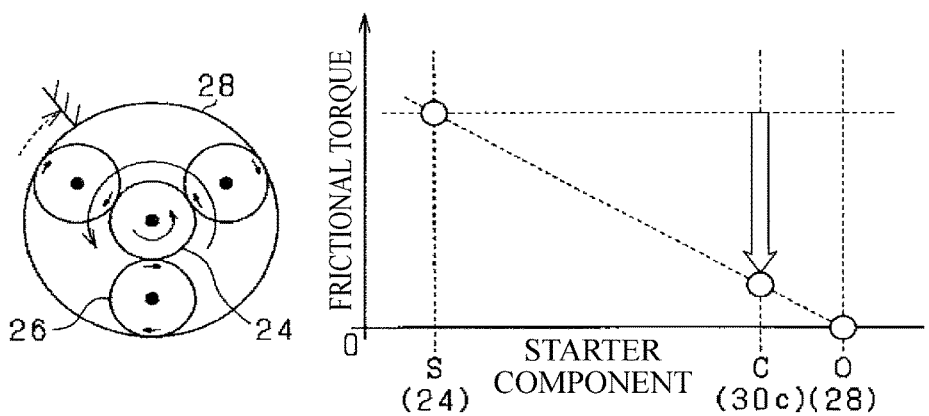

The nomographic chart of FIG. 3(c) indicates an example where the torque acting on the carrier shaft 30c is further increased above that in FIG. 3(b). The outer gear side contacting portion 28c fully slides on the carrier flange 30c2. The outer gear 28 is, thus, urged to rotate in the reverse direction, but held by the one-way clutch 22 from rotating in the reverse direction, thereby stopping the outer gear 28 from rotating. This causes the speed reduction ratio of the planetary gear train 16 to be fixed to a given value greater than one. The planetary gear train 16 of this embodiment is designed to have the given value that is five. After the engine has been started up completely, the starter switch is turned off to stop supplying the current to the exciting coil to stop the motor 12 from rotating. This causes the pinion gear 20 to be disengaged from the ring gear 34 to the resting position.

As apparent from the above discussion, when the torque required to rotate the pinion gear 20 to start the engine is low, the starter 10 achieves a speed reduction ratio of one and rotates the pinion gear 20 at a high speed, thereby quickly starting the engine.

When it is required to start the engine in a cold condition, that is, the toque required to rotate the pinion gear 20 is high, the starter 10 works to achieve a speed reduction ratio of five at an initial stage of an engine star-up period of time without need for controlling the current to be supplied to the motor 12. This causes the engine to be cranked by a large degree of torque. The speed of the pinion gear 20 is lower than that when the speed reduction ratio of the planetary gear train 16 is one, in other words, the speed of the pinion gear 20 is low when the pinion gear 20 meshes with the ring gear 34, so that a desired depth of engagement of the pinion gear 20 with the ring gear 34 is ensured to minimize a decrease in reliability in starting the engine arising from a failure in engagement between the pinion gear 20 with the ring gear 34. Afterward, when the speed of the engine rises, so that the torque required to drive the pinion gear 20 is lowered, the torque acting on the carrier shaft 30c is lowered below the non-slip torque. This establishes firm engagement between the outer gear side contacting portion 28c and the carrier flange 30c2, so that the planetary gear train 16 is switched to a speed reduction ratio of one, thereby enabling the starter 10 to crank the engine at high speed.

The planetary gear train 16 of the starter 10 is, as will be clear from the above discussion, engineered to change the speed reduction ratio from one to a selected value greater than one when the motor 12 is operating, and torque acting on the planetary carrier 30 exceeds the frictional torque.

Figure 4:
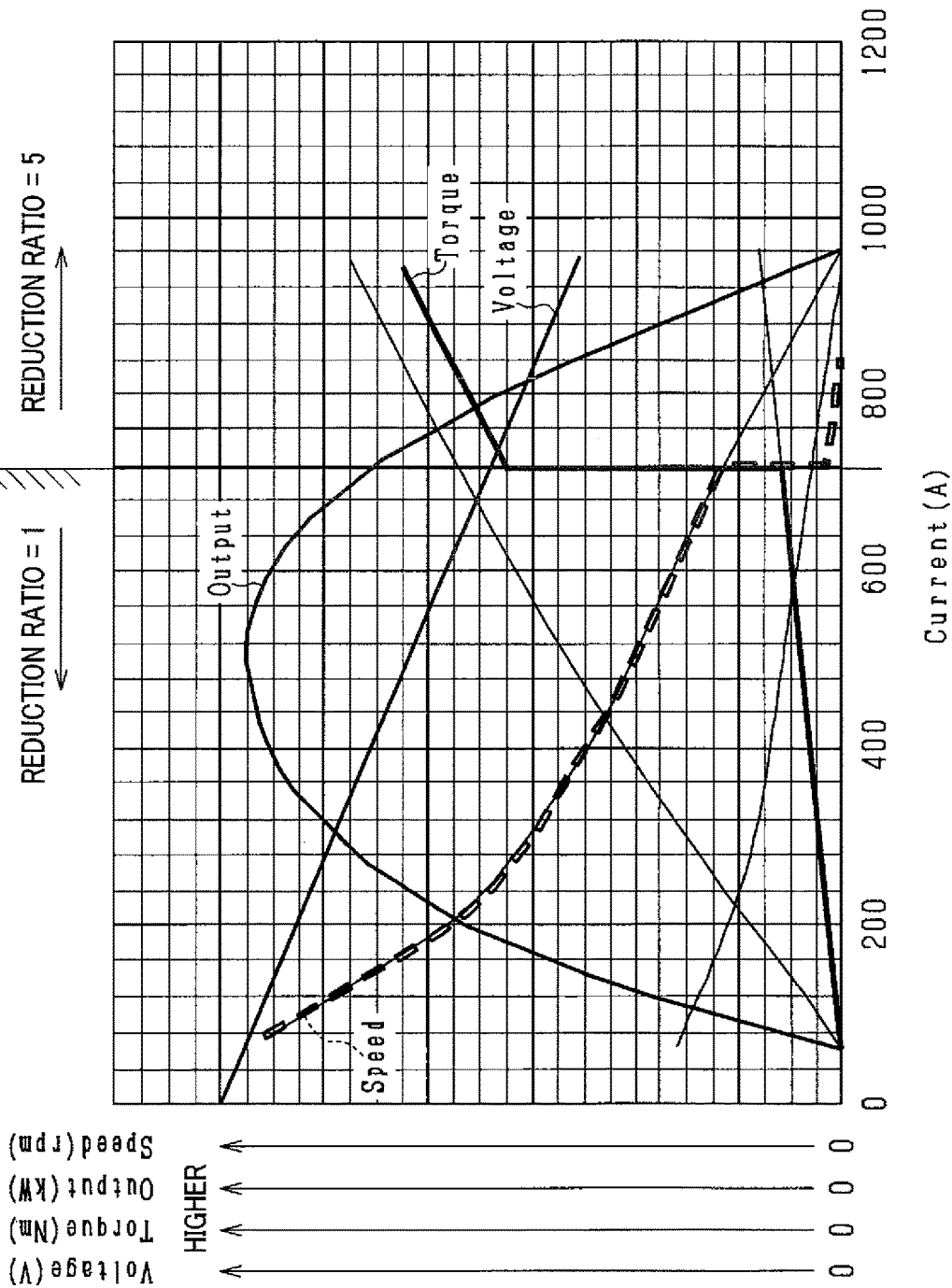
FIG. 4 is a graph which represents characteristics of the starter of FIG. 1.

FIG. 4 is a graph which represents characteristics of the starter 10. The horizontal axis indicates the value of electric current supplied to the motor 12. The vertical axis indicates the level of voltage applied to the motor 12, the degree of torque produced by the starter 10, the output power of the starter 10, and the speed of the pinion gear 20.

The graph of FIG. 4 exemplifies the case where the locking of the outer gear 28 to the carrier shaft 30c1, as established by the pressure exerted by the spring mechanism 36 on the outer gear side contacting portion 28c, is released when a large current more than or equal to 600 A flows to the motor 12 to start the engine in a cold condition. This design of the spring mechanism 36 enables the starter 10 to achieve a speed reduction ratio of five when the large current is supplied to the motor 12 to commence starting the engine and then achieve a speed reduction ratio of one when the current supplied to the motor 12 is decreased.

As apparent from the above discussion, the starter 10 of this embodiment has a simple structure equipped with the outer gear side contacting portion 28c, the carrier flange (i.e., the carrier side contacting portion) 30c2, and the one-way clutch 22 and is engineered to ensure the stability in starting the engine.

The surfaces of the outer gear side contacting portion 28c and the carrier flange 30c2 which are placed in slidable contact with each other extend perpendicular to the axial direction of the starter 10 (i.e., the carrier shaft 30c), thus facilitating the ease with which a mechanism which urges the outer gear side contacting portion 28c and the carrier flange 30c2 into constant abutment with each other through the spring mechanism 36 is manufactured. The starter, as discussed in the introductory part of this application, is designed to establish the joining of the movable cam plate and the housing by the frictional resistance on the tapered surfaces thereof in order to achieve a high speed reduction ratio in the planetary gear train, however, such structure requires increased accuracy in machining the tapered surfaces of the movable cam plate and the housing.

The starter 10 is also designed to have disposed inside the inner periphery of the clutch contacting portion 28b the mechanism which fastens the outer gear 28 and the carrier shaft 30c together or unfastens them, thus permitting the mechanism to be minimized in size which results in a decrease in overall size of the starter 10.

Second Embodiment

Figure 5:
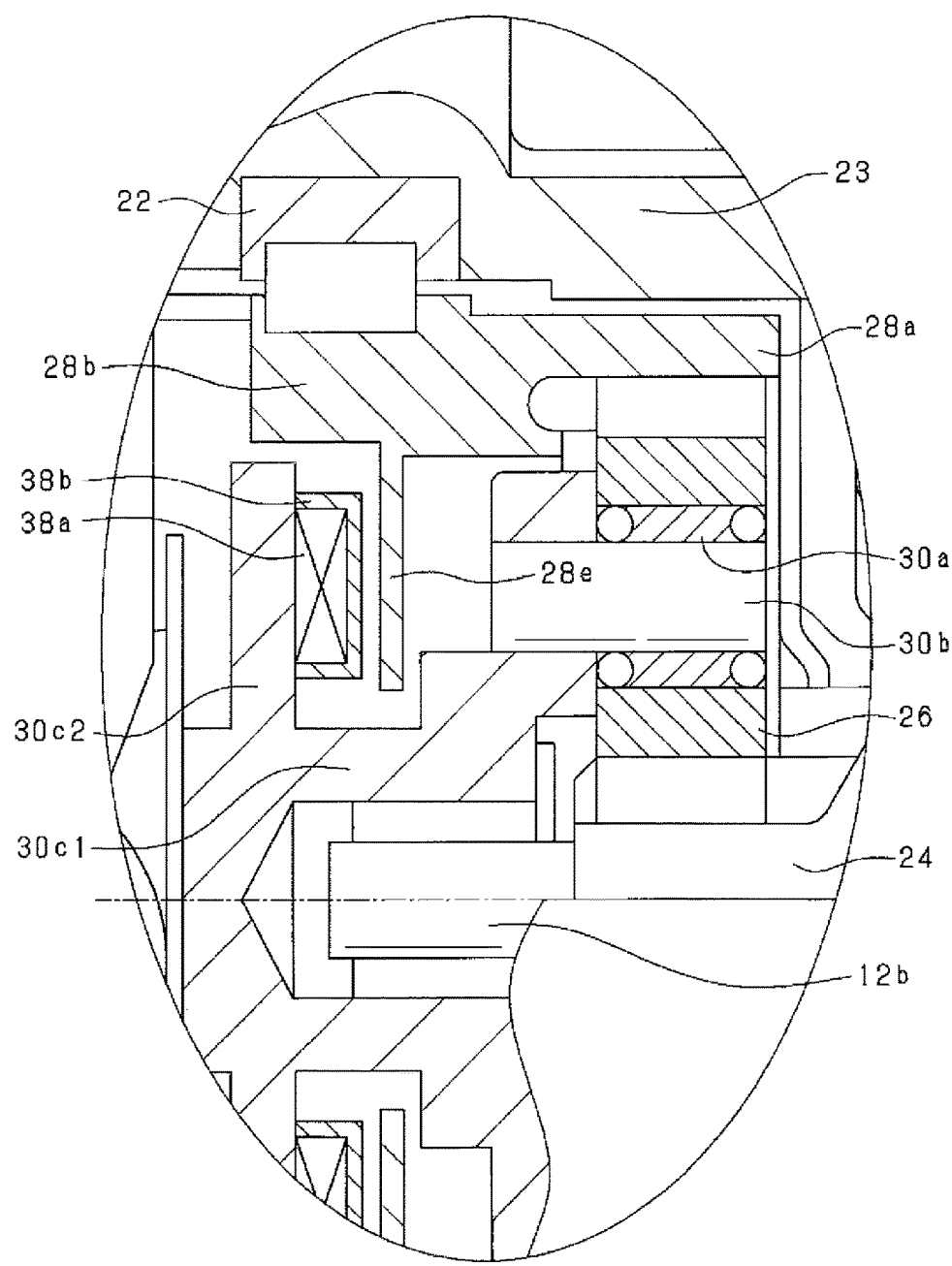
FIG. 5 is a partially enlarged view which illustrates a starter according to the second embodiment.

FIG. 5 is a partial sectional view which illustrates the starter 10 according to the second embodiment which is different from the first embodiment in use of an electromagnetic clutch as a variable speed reducer also called a torque variator which includes the outer gear 28, the planetary carrier 30, and the spring mechanism 36 and works to vary the torque transmitted from the outer gear 28 to the planetary carrier 30 in the first embodiment. The same reference numbers as employed in the first embodiment of FIG. 1 will refer to the same parts, and explanation thereof in detail will be omitted here.

The electromagnetic clutch includes an exciting coil 38a which is energized by the current supplied from the battery, a housing 38b which forms a magnetic circuit around the exciting coil 38a, and a clutch plate 28e which faces an end surface of the housing 38b. The clutch plate 28e is made of an annular disc and movable in the axial direction of the starter 10 (i.e., the center shaft 30c1). The clutch plate 28e is formed by a portion of the outer gear 28.

In operation, when the exciting coil 38a is deenergized, an air gap is created between the clutch plate 28e and the end surface of the housing 38b. This unfastens or releases the locking of the outer gear 28 to the carrier shaft 30c, so that a speed reduction ratio of five is established in the planetary gear train 16. Alternatively, when the exciting coil 38a is energized, so that a magnetic force is created in the housing 38b, a magnetic attraction is developed between the clutch plate 28e and the end surface of the housing 38b to attract the clutch plate 28e to the housing 38b. This fastens or locks the outer gear 28 and the carrier shaft 30c, so that they rotate together, thereby achieving a speed reduction ratio of one in the planetary gear train 16.

A speed reduction ratio switching operation which controls the electric energization of the electromagnetic clutch will be described below.

Figure 6:
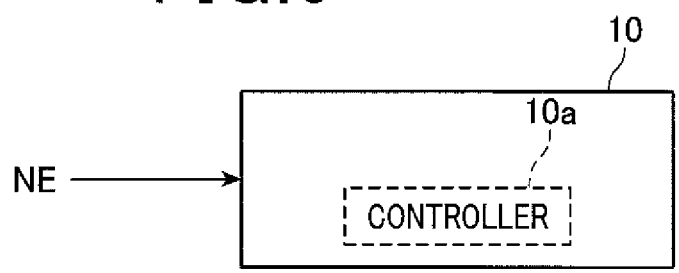
FIG. 6 is a block diagram which illustrates a controller for the starter of the second embodiment in FIG. 5.

The speed reduction ratio switching operation may be executed by a controller installed in the starter 10 or an engine controller which is mounted outside the starter 10 to control an operation of the engine. In this embodiment, the starter 10, as illustrated in FIG. 6, has installed therein a controller 10a which performs the speed reduction ratio switching operation. To the controller 10a, a signal indicative of the speed NE of the engine is inputted from outside the starter 10.

Figure 7:
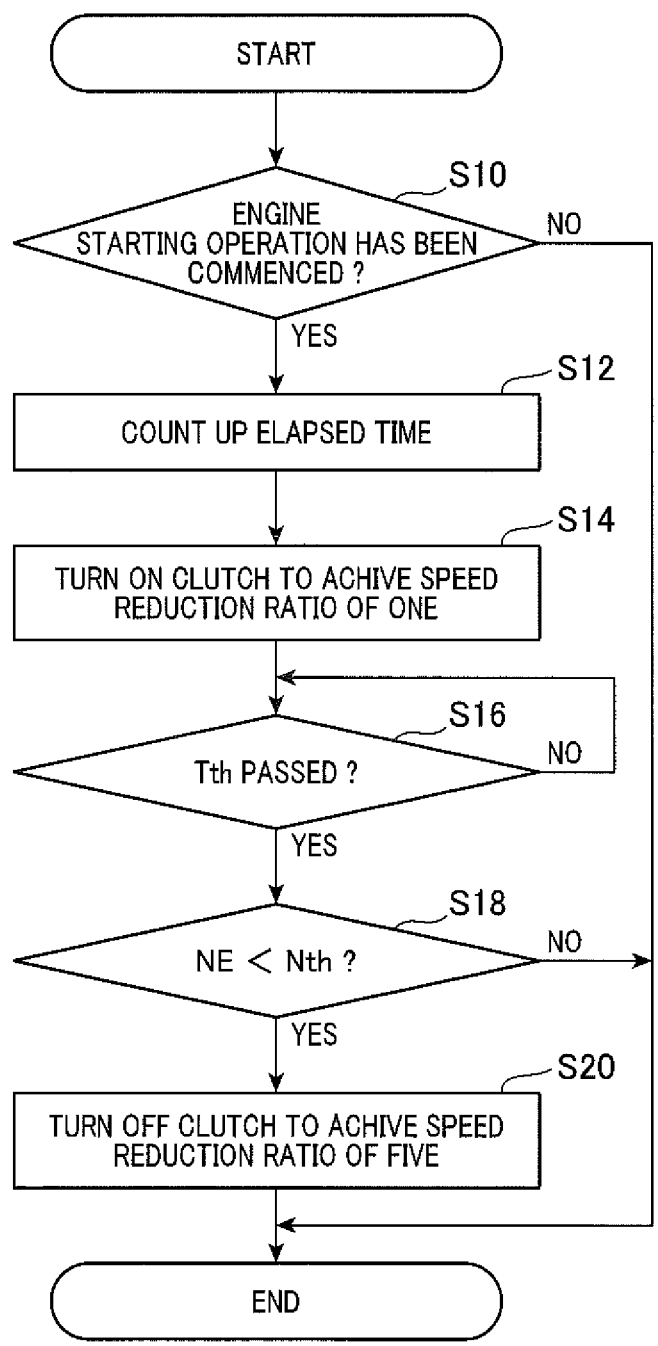
FIG. 7 is a flowchart of a program to execute a speed reduction ratio switching operation in the second embodiment.

FIG. 7 is a flowchart of a sequence of logical steps or program to execute the speed reduction ratio switching operation. The program is performed cyclically by the controller 10a at a given time interval.

After entering the program, the routine proceeds to step S10 wherein it is determined whether an engine starting operation has been commenced or not. This determination is made to determine whether the motor 12 has started to be driven or not. For instance, the controller 10a determines whether information about the fact that the starter switch has been turned on has been inputted to the controller 10a or not.

If a YES answer is obtained in step S10, then the routine proceeds to step S12 wherein a time elapsed since a YES answer was obtained in step S10 is counted up. The routine then proceeds to step S14 wherein the exciting coil 38a is electrically energized to achieve a speed reduction ratio of one in the planetary gear train 16.

The routine then proceeds to step S16 wherein it is determined whether the elapsed time, as derived in step S10, has reached a reference time Tth or not. If a NO answer is obtained, then the routine repeats step S16. Alternatively, if a YES answer is obtained, then the routine proceeds to step S18 wherein it is determined whether the speed NE of the engine is lower than a reference speed Nth or not. This determination is made to determine whether the speed NE of the engine is still below a speed required for the engine to be fired or started up or not. For instance, when the engine is in a cold condition, a YES answer may be obtained.

If a YES answer is obtained in step S18 meaning that the speed NE of the engine has not yet reached the reference speed Nth within the reference time Nth, then the routine proceeds to step S20 wherein the supply of current to the exciting coil 38a is cut off to achieve a speed reduction ratio of five in the planetary gear train 16 for completing the start-up of the engine.

Figure 8:
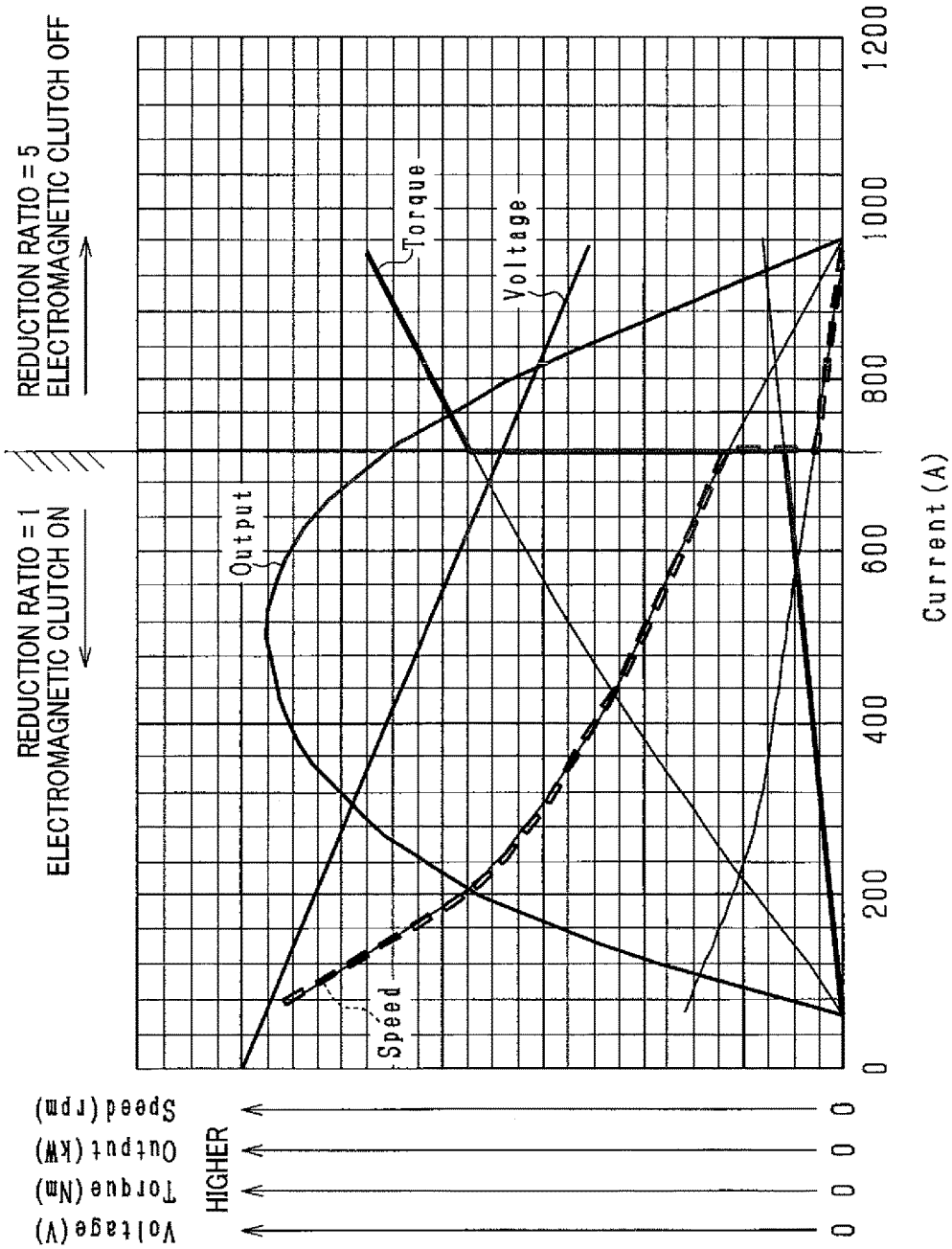
FIG. 8 is a graph which represents characteristics of the starter of the second embodiment in FIG. 5.

FIG. 8 is a graph which represents characteristics of the starter 10 to switch the speed reducing ratio of the planetary gear train 16 through the electromagnetic clutch. The horizontal and vertical axes represent the same parameters as in FIG. 4.

As apparent from the above discussion, when the speed NE of the engine does not increase to the reference speed Nth within the reference time Tth, the starter 10 works to switch the speed reduction ratio of the planetary gear train 16 to five at the time when the reference time Tth expires. This produces a large degree of torque to start the engine quickly in cold conditions and also ensures a required depth of engagement of the pinion gear 20 with the ring gear 34 of the engine. When the engine is not placed in the cold condition, the starter 10 keeps the speed reduction ratio of the planetary gear train 16 at one to crank the engine at high speed.

Third Embodiment

The starter 10 of this embodiment is different from that in the second embodiment only in the speed reduction ratio switching operation. Other arrangements are identical, and explanation thereof in detail will be omitted here.

Figure 9:
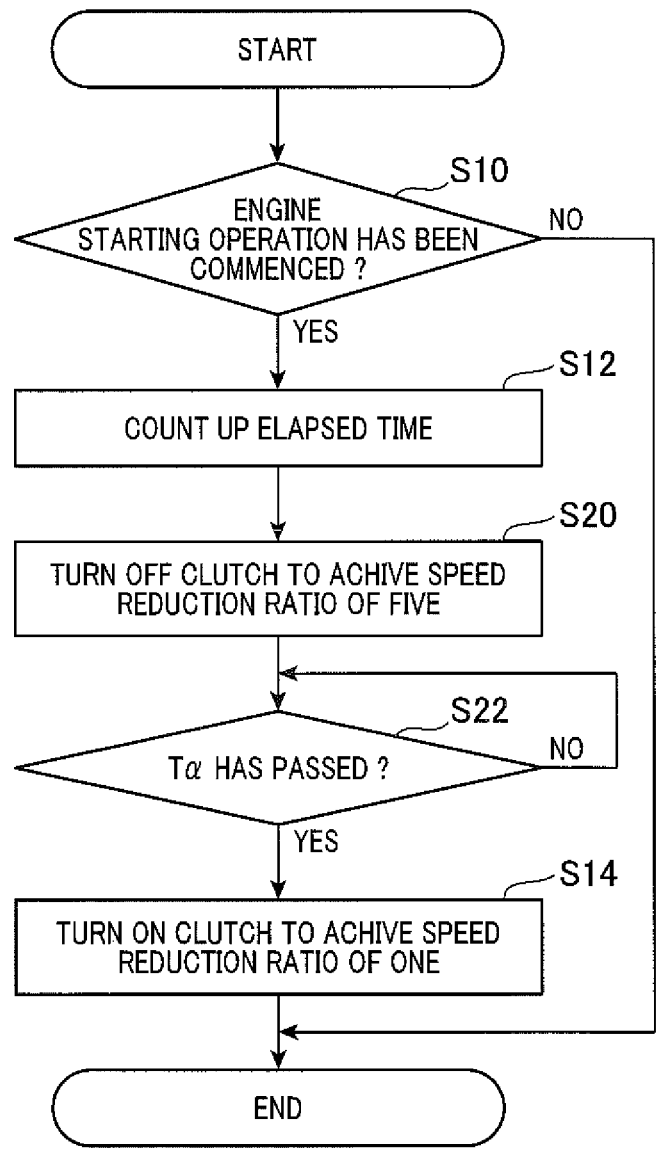
FIG. 9 is a flowchart of a program to execute a speed reduction ratio switching operation in the third embodiment.

FIG. 9 is a flowchart of a sequence of logical steps or program to execute the speed reduction ratio switching operation. The program is performed cyclically by the controller 10a at a given time interval. The same step numbers as employed in FIG. 7 refer to the same operations.

After the time elapsed since a YES answer was obtained in step S10 is counted up in step S12, the routine then proceeds to step S20 wherein the exciting coil 38a is deenergized to establish a speed reduction ratio of five in the planetary gear train 16. The routine then proceeds to step S22 wherein it is determined whether the elapsed time, as derived in step S10, has reached a reference time Ta or not. If a NO answer is obtained, then the routine repeats step S22. Alternatively, if a YES answer is obtained, then the routine proceeds to step S14 wherein the exciting coil 38a is electrically energized to achieve a speed reduction ratio of one in the planetary gear train 16.

As apparent from the above discussion, the starter 10 of this embodiment works to increase the speed reduction ratio of the planetary gear train 16 in an initial stage of starting the engine and then crank the engine at a speed reduction ratio of one. Specifically, the electromagnetic clutch is electrically controlled to establish a unlocked state in which the planetary carrier 30 and the outer gear 28 does not rotate together for a given period of time from when the engine starts to be started and then achieve a locked state in which the planetary carrier 30 and the outer gear 28 rotate together until start-up of the engine is completed. This minimizes a failure in engagement of the pinion gear 20 with the ring gear 34 and achieves a high-speed cranking operation of the engine.

Fourth Embodiment

FIGS. 10 to 14 illustrates the starter 10 according to the fourth embodiment which is different from the first embodiment in structure of a variable speed reducer also called a torque variator. The same reference numbers as employed in the first embodiment of FIGS. 1 and 2 will refer to the same parts, and explanation thereof in detail will be omitted here. FIGS. 11 to 14 are schematic views which partially omit or simplify the structure of FIG. 10.

The carrier shaft 30c (i.e., the planetary carrier 30) is equipped with a planetary side rotor 30c4 and a pinion side rotor 30c5. The planetary side rotor 30c4 is of a hollow cylindrical shape and joined at an end thereof facing the motor 12 to the pins 30b. The pinion side rotor 30c5 is made of a discrete member separate from the planetary side rotor 30c4. The pinion side rotor 30c5 is arranged in alignment with the planetary side rotor 30c4 in the axial direction of the starter 10. The pinion side rotor 30c5 is connected to the pinion gear 20 through the overrunning clutch 18. The center axis of the planetary side rotor 30c4 and the center axis of the pinion side rotor 30c5 are aligned with the center axis of the carrier shaft 30c, as indicated by a dashed line in FIG. 10.

Figure 11:
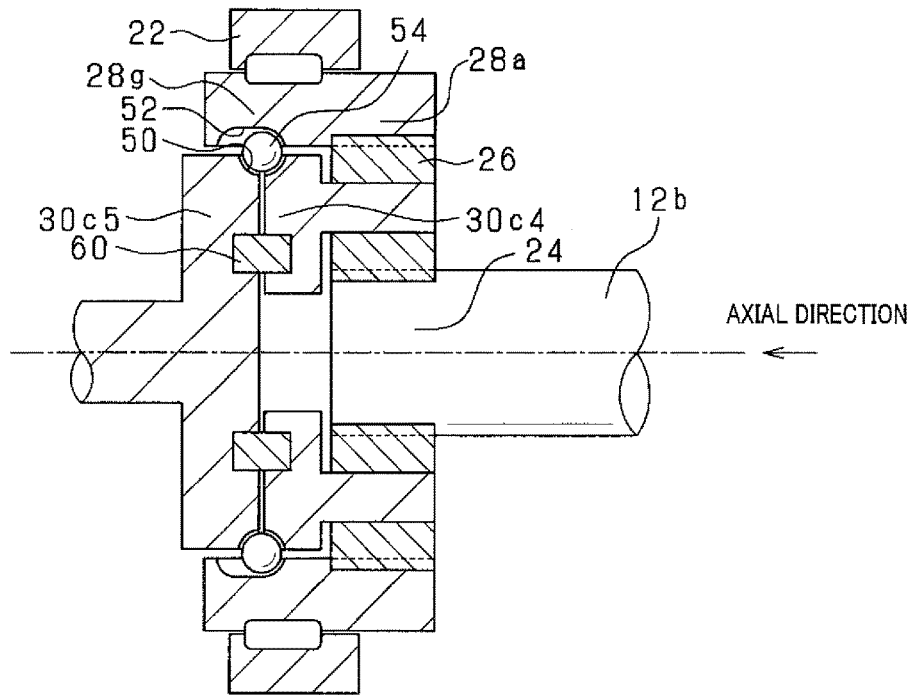
FIG. 11 is a traverse section which illustrates a torque variator installed in the starter of FIG. 10.

The outer gear 28 is, as illustrated in FIG. 11, equipped with the toothed portion 28a and the clutch contacting portion 28g formed integrally with the toothed portion 28a. The clutch contacting portion 28g is hollow cylindrical and located closer to the pinion gear 20 than the toothed portion 28a is in the axial direction of the outer gear 28 (i.e., starter 10). The clutch contacting portion 28g is disposed to have an outer periphery placed in contact with rollers of the one-way clutch 22.

The planetary side rotor 30c4 and the pinion side rotor 30c5 are disposed inside the inner periphery of the outer gear 28. The assembly of the planetary side rotor 30c4 and the pinion side rotor 30c5, as clearly illustrated in FIGS. 11 and 12, has a plurality of U-shaped carrier grooves 50 formed in the outer periphery thereof. In other words, each of the carrier grooves 50 is formed in the outer circumferential surfaces of both the planetary side rotor 30c4 and the pinion side rotor 30c5. Each of the carrier grooves 50 extends over and along the boundary between the planetary side rotor 30c4 and the pinion side rotor 30c5 in a circumferential direction of the assembly of the planetary side rotor 30c4 and the pinion side rotor 30c5. In this embodiment, the assembly of the planetary side rotor 30c4 and the pinion side rotor 30c5 has the four grooves 50 which are arranged at equal intervals of 90° away from each other in the circumferential direction. The steel ball 54 that is a spherical roller is disposed in each of the grooves 50 and functions as a rolling element. The width of each of the grooves 50 is slightly greater than that of the steel balls 54.

The clutch contacting portion 28g, as can be seen in FIG. 11, has an outer gear groove 52 formed in a portion of the outer periphery thereof which faces the carrier grooves 50. The outer gear groove 52 extend over the whole of the inner circumference of the clutch contacting portion 28g.

Figure 12:
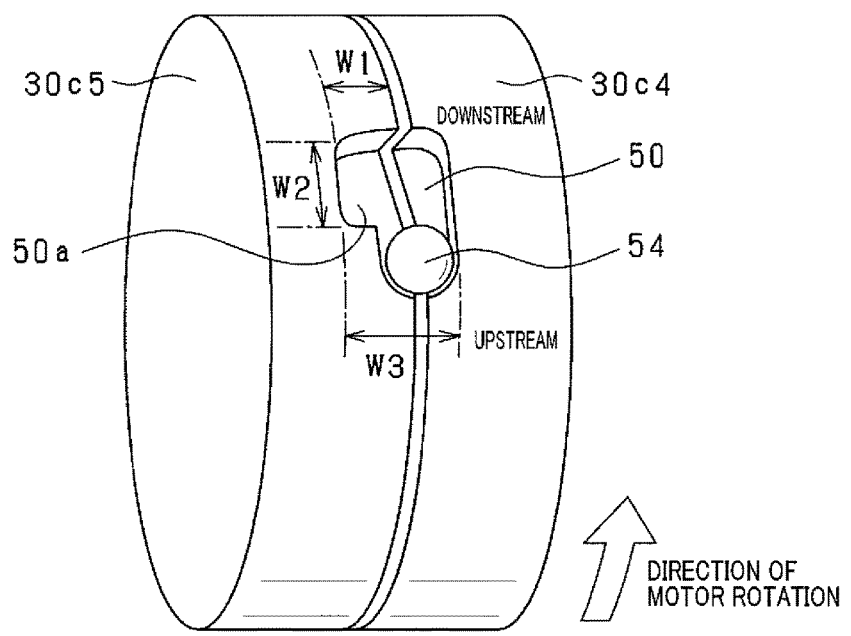
FIG. 12 is a partially perspective view of a rotor assembly of the torque variator of FIG. 11.

Each of the carrier grooves 50 and the outer gear groove 52 define a roller chamber in which one of the steel balls 54 is disposed to be rollable. The pinion side rotor 30c5 has ball-holding grooves 50a formed in the outer circumferential surface thereof on a downstream side of the carrier grooves 50 in a direction in which the pinion side rotor 30c5 is rotated by the motor 12. Specifically, each of the ball-holding grooves 50a extends in the axial direction of the pinion side rotor 30c5 and the planetary side rotor 30c4 continuously from the downstream side of the carrier groove 50 in the direction of rotation of the pinion side rotor 30c5 and the planetary side rotor 30c4 and is shaped to hold therein the steel ball 54 from crossing the boundary between the planetary side rotor 40c4 and the pinion side rotor 30c5. The first groove width W1 that is, as can be seen in FIG. 12, an interval between the inner wall of each of the ball-holding grooves 50a in the axial direction of the pinion side rotor 30c5 and the end surface of the pinion side rotor 30c5 facing the planetary side rotor 30c4 in the axial direction of the pinion side rotor 30c5 is selected to be slightly greater than the diameter of the steel balls 54. The second groove width W2 that is an interval between opposed portions of the inner wall of each of the ball-holding grooves 50a in the circumferential direction of the pinion side rotor 30c5 is selected to be greater than the diameter of the steel balls 54. With this geometry, the ball-holding grooves 50a hold the steel balls 54 from rolling over the planetary side rotor 30c4.

The carrier grooves 50 and the ball-holding grooves 50a have a depth which gradually decreases from the downstream side to the upstream side thereof in the direction of rotation of the planetary side rotor 30c4 and the pinion side rotor 30c5. In other words, each of the carrier groove 50 and the holding groove 50a has upstream and downstream depths in the direction of rotation of the planetary side rotor 30c4 and the pinion side rotor 30c5. The upstream depth is smaller than the downstream depth. The outer gear groove 52 has a constant depth over the whole of the circumference of the clutch contacting portion 28g. The outer gear groove 52 has a width in the axial direction of the outer gear 28 which is slightly greater than or equal to the groove width W3 that is an interval between the inner wall of each of the ball-holding grooves 50a and the inner wall of a corresponding one of the carrier grooves 50 in the axial direction of the planetary side rotor 30c4 and the pinion side rotor 30c5. The ball-holding grooves 50a may be formed in the outer circumferential surfaces of at least one of the planetary side rotor 30c4 and the pinion side rotor 50c5.

The starter 10 is equipped with a torque transmitting mechanism, as illustrated in FIGS. 13(a) to 14. The torque transmitting mechanism works to transmit torque from the planetary side rotor 30c4 to the pinion side rotor 30c5 and is disposed between the planetary side rotor 30c4 and the pinion side rotor 30c5 so that the a difference occurs between torque acting on the planetary side rotor 30c5 and torque acting on the pinion side rotor 30c4, thereby causing the pinon side rotor 30c5 to rotate relative to the planetary side rotor 30c4. FIG. 13(a) is an illustration of the pinion side rotor 30c5, as viewed from the planetary side rotor 30c4. FIG. 13(b) is an illustration of the planetary side rotor 30c4, as viewed from the pinion side rotor 30c5.

The pinion side rotor 30c5 has holding recesses 58a formed on the end surface thereof which faces the planetary side rotor 30c4. The holding recesses 58a are arranged at equal intervals away from each other in the circumferential direction of the pinion side rotor 30c5. In this embodiment, the four holding recesses 58a are located at 90° away from each other in the circumferential direction of the pinion side rotor 30c5. Each of the holding recesses 58a is trapezoidal and has a width increasing in a radially outward direction of the pinion side rotor 30c5. The planetary side rotor 30c4 has holding recesses 56a formed on the end surface thereof which faces the pinion side rotor 30c5. Each of the holding recesses 56a is aligned or coincide with one of the holding recesses 58a in the axial direction of the planetary side rotor 30c4. The holding recesses 56a are identical in number and shape (i.e., geometry) with the holding recesses 58a. The holding recesses 56a and 58a also work as a positioner to position rubber members 60.

The rubber members 60 are, as illustrated in FIG. 14, fit one in each of the recesses 56a and 58a. In other words, each of the recesses 56a and a corresponding one of the recesses 58a serve as a rubber holder in which one of the rubber members 60 is retained. Each of the rubber members 60 is trapezoidal in cross section contoured to conform with the recesses 56a and 58a. The sum of depths of each of the holding recesses 56a of the planetary side rotor 30c4 and a corresponding one of the holding recesses 58a of the pinion side rotor 30c5 is shorter than the length of the rubber members 60 in the axial direction of the planetary side rotor 30c4 and the pinion side rotor 30c5, so that the rubber members 60 are exposed to an air gap created between the mutually facing surfaces of the planetary side rotor 30c4 and the pinion side rotor 30c5.

The planetary side rotor 30c4 has upright walls (i.e., protrusions) 56b formed on the end surface thereof facing the pinion side rotor 30c5. The upright walls 56b extend in the axial direction of the planetary side rotor 30c4. Each of the upright walls 56b is located on an upstream one of four edges of a corresponding one of the holding recesses 56a in the direction of rotation of the motor 12. Each of the upright walls 56b is of a plate-like shape and has a length in the axial direction of the planetary side rotor 30c4. The length is about half of the length of the rubber members 60 in the axial direction of the planetary side rotor 30c4. Similarly, the pinion side rotor 30c5 has upright walls (i.e., protrusions) 58b formed on the end surface thereof facing the planetary side rotor 30c4. The upright walls 58b extend in the axial direction of the pinion side rotor 30c5. Each of the upright walls 58b is located on a downstream one of four edges of a corresponding one of the holding recesses 58a in the direction of rotation of the motor 12. Each of the upright walls 58b is of a plate-like shape and has a length in the axial direction of the pinion side rotor 30c5. The length is about half of the length of the rubber members 60 in the axial direction of the pinion side rotor 30c5. The end surfaces of the planetary side rotor 30c4 and the pinion side rotor 30c5, as can be seen in FIG. 11, face each other to define the rubber holders for the rubber members 60. Each of the upright walls 56b faces one of the upright walls 58b in the direction of rotation of the motor 12 (i.e., the circumferential direction of the planetary side rotor 30c4 and the pinion side rotor 30c5), so that they work as rubber stoppers. In other words, each of the rubber members 60 is firmly held between corresponding ones of the upright walls 56b and 58b in close contact therewith.

When the motor 12 is rotating, the upright walls 56b of the planetary side rotor 30c4 work as press plates to compress the rubber members 60 in the direction of rotation of the motor 12, while the upright walls 58a of the pinion side rotor 30c5 work as stopper plates to bear the pressure, as produced by the compression of the rubber members 60. The amount (which will also be referred to as a relative rotation amount below) by which the pinion side rotor 30c5 rotates relative to the planetary side rotor 30c4 increases with an increase in difference between degrees of torque acting on the planetary side rotor 30c4 and the pinion side rotor 30c5. The amount by which the pinion side rotor 30c5 rotates relative to the planetary side rotor 30c4 has a given upper limit in terms of the structure thereof.

The operation of the starter 10 of this embodiment will be described below with reference to FIGS. 15(a) and 15(b).

When the torque acting on the pinion side rotor 30c5 (i.e., the pinion gear 20) is low, the amount by which the planetary side rotor 30c4 rotates relative to the pinion side rotor 30c5 will be small or zero. The steel balls 54 are located at the upstream side of the carrier grooves 50 in the direction of rotation of the motor 12. Since the depth of the carrier grooves 50 gradually decreases from upstream to downstream in the direction of rotation of the motor 12, the steel balls 54 are pressed against the clutch contacting portion 28g of the outer gear 28 and the pinion side rotor 30c5, thereby locking the clutch contacting portion 28g (i.e., the outer gear 28) and the pinion side rotor 30c5. This causes, as already illustrated in FIG. 3(a), the sun gear 24, the carrier shaft 30c, and the outer gear 28 to rotate together, thus achieving a speed reduction ratio of one in the planetary gear train 16.

Figures 15A, 15B:
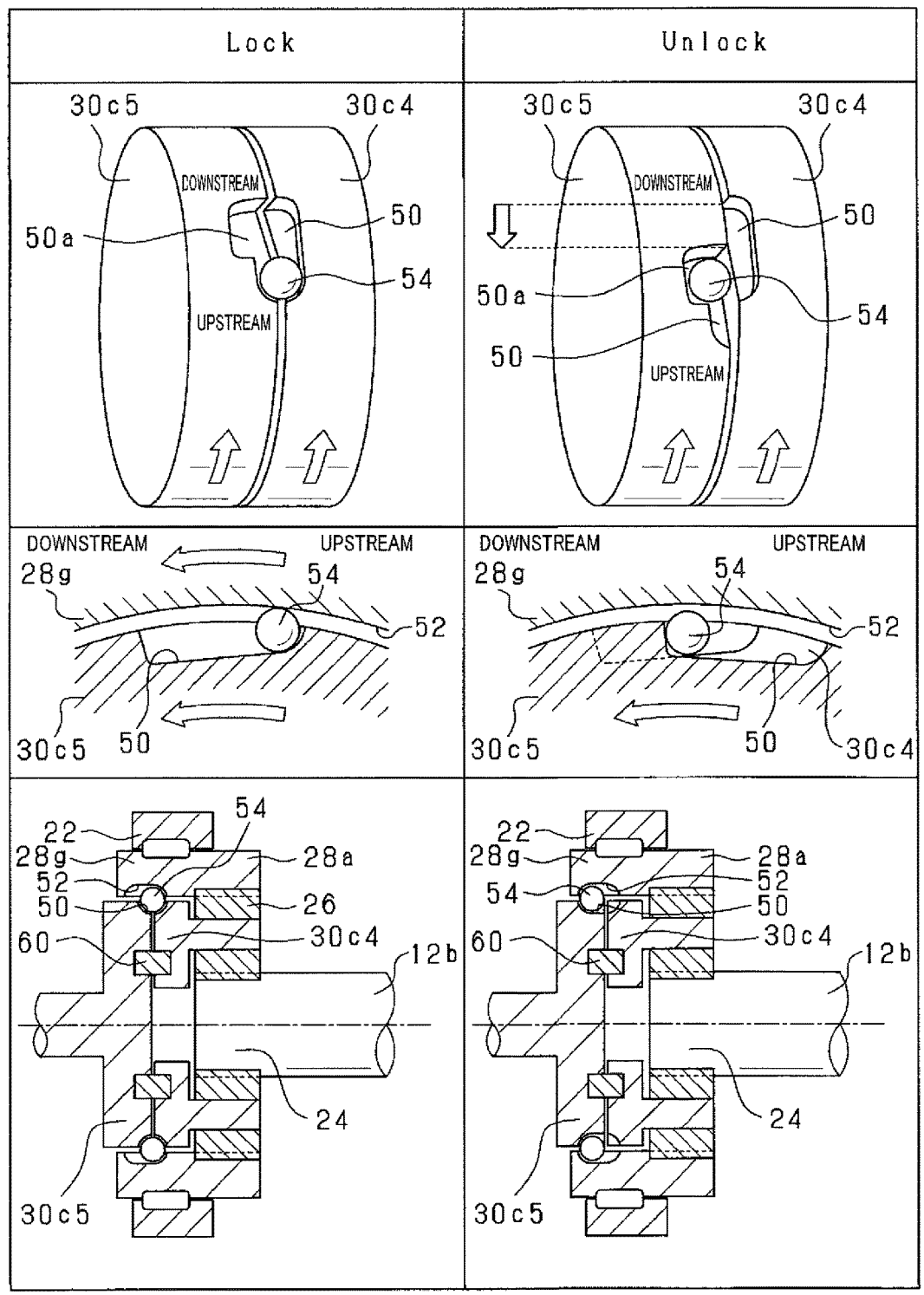
FIGS. 15(a) and 15(b) are views which illustrate operations of the starter of FIG. 10 in the fourth embodiment.

When the torque acting on the pinion side rotor 30c5 increases above a given level, the rubber members 60 held between the upright walls 56b and 58b are compressed in the circumferential direction of the pinion side rotor 30c5, so that the planetary side rotor 30c4 is, as illustrated in FIG. 15(b), shifted by a given angle away from the pinion side rotor 30c5. This causes each of the steel balls 54 to roll downstream into the ball-holding groove 50a from the upstream side of the carrier groove 50, thereby unlocking the clutch contacting portion 28g and the pinion side rotor 30c5. This permits the outer gear 28 to rotate relative to the carrier shaft 30c, so that the planet gears 26, as illustrated in FIG. 3(b), rotate. The one-way clutch 22, as described above, holds the outer gear 28 from rotating in the reverse direction, thus fixing, as illustrated in FIG. 3(c), the speed reduction ratio of the planetary gear train 16 to a given value greater than one.

As apparent from the above discussion, the torque variator which, as described above, variably transmits torque between the planetary carrier 30 and the outer gear 28 includes a locking-unlocking mechanism which serves to lock the planetary carrier 30 and the outer gear 28 when the relative rotation amount by which the pinion side rotor 30c5 rotates relative to the planetary side rotor 30c4 is lower than a given value and unlock the planetary carrier 30 and the outer gear 28 when the relative rotation amount is greater than or equal to the given value.

Specifically, when the torque required to rotate the pinion gear 20 is low, the starter 10 establishes a speed reduction ratio of one in the planetary gear train 16, so that the pinion gear 20 rotates at high speed, thus improving the startability of the engine. Alternatively, when the torque required to rotate the pinion gear 20 is high, for example, in a cold condition, the starter 10 establishes a speed reduction ratio of five in the planetary gear train 16 at the initial stage of starting the engine without need for controlling the energization of the motor 12, thereby cranking the engine with a large torque.

Usually, the engine undergoes start fuel increasing control. The start fuel increasing control is to increase the quantity of fuel to be injected to the engine with a decrease in temperature of the engine for a period of time from start of the engine until the speed of the engine exceeds a given value. The cranking of the engine at high speed improves the startability of the engine and minimizes a period of time for which the start fuel increasing control should be executed. This results in a decrease in quantity of fuel consumed by the engine.

When the speed reduction ratio of the planetary gear train 16 of the starter 10 of this embodiment is switched from one to a great value, the clutch contacting portion 28g of the outer gear 28 does not slide directly on either of the rotors 30c4 and 30c5 forming the carrier shaft 30c, thus minimizing mechanical noise arising from the operation of the starter 10 or improving the durability of the starter 10.

The rotors 30c4 and 30c5 have the holding recesses 56a and 58a formed in the mutually facing surfaces of the rotors 30c4 and 30c5, thereby resulting in an increase in area of contact between the rotors 30c4 and 30c5 and each of the rubber members 60. This enhances the efficiency in transmitting torque between the rotors 30c4 and 30c5 through the rubber members 60 and also permits the axial length of the assembly of the rotors 30c4 and 30c5 to be decreased, thus resulting in a decrease in overall size of the starter 10.

Fifth Embodiment

Figure 16A:
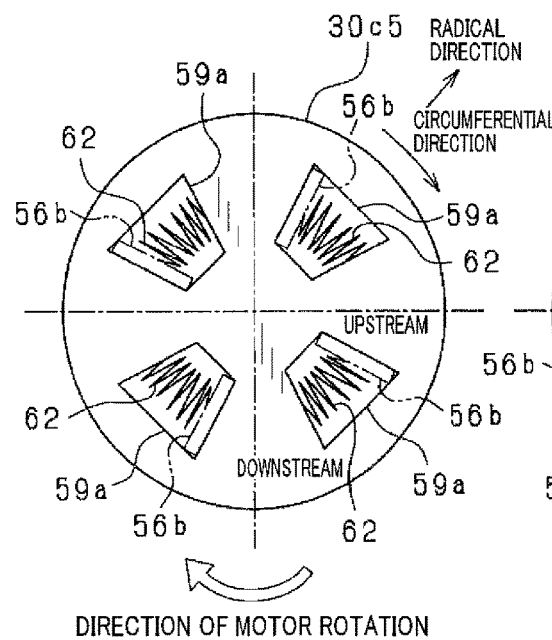
FIGS. 16(a) and 16(b) are views which illustrate a torque transmitting mechanism of a torque variator according to the fifth embodiment.
Figure 16B:
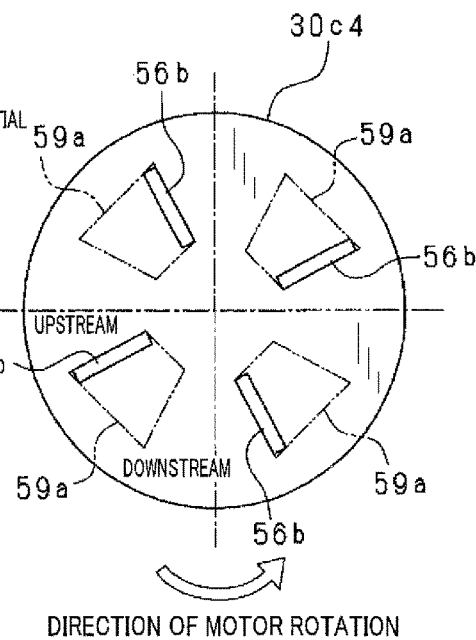

The starter 10 of the fifth embodiment will be described below with reference to FIGS. 16(a) and 16(b). The starter 10 of this embodiment is a modification of that in the fourth embodiment. Specifically, the starter 10 is, as can be seen in FIGS. 16(a) and 16(b), equipped with coil springs 62 instead of the rubber members 60 used in the fourth embodiment. The same reference numbers as employed in FIGS. 13(a) and 13(b) will refer to the same parts, and explanation thereof in detail will be omitted here.

The planetary side rotor 30c4 does not have the holding recesses 56a formed on the end surface thereof which faces the pinion side rotor 30c5, while the pinion side rotor 30c5 has holding recesses 59a formed on the end surface thereof which faces the planetary side rotor 30c4. The holding recesses 59a are arranged at equal intervals away from each other in the circumferential direction of the pinion side rotor 30c5. More specifically, the four holding recesses 59a are located at 90° away from each other in the circumferential direction of the pinion side rotor 30c5. Portions of the end surface of the pinion side rotor 30c5 onto which the upright walls 56b are projected are indicated by two-dot chain lines in FIG. 16(a). Portions of the end surface of the planetary side rotor 30c4 onto which the holding recesses 59a of the pinion side rotor 30c5 are projected are indicated by two-dot chain lines in FIG. 16(b).

Each of the holding recesses 59a of the pinion side rotor 30c5 has a coil spring 62 disposed therein. Each of the holding recesses 59a has a seat which is formed on a portion of the inner wall thereof located downstream in the direction of rotation of the motor 12 and on which the coil spring 62 rides. When the end surfaces of the planetary side rotor 30c4 and the pinion side rotor 30c5 are joined together, each of the upright walls 56b lies or is disposed in a corresponding one of the holding recesses 59a. FIGS. 16(a) and 16(b) illustrate the case where an amount by which the planetary side rotor 30c4 rotates relative to the pinion side rotor 30c5 is zero. When such an amount relative rotation is zero, the upright walls 56b of the planetary side rotor 30c4 are pressed at all the time by the coil springs 62, respectively, from the downstream side to the upstream side in the direction of rotation of the motor 12. The assembly of the planetary side rotor 30c4 and the pinion side rotor 30c5 may alternatively be designed that when the amount of relative rotation is zero, the pressure, as produced by the coil springs 62, does not act on the upright walls 56b.

The starter 10 of this embodiment uses the coil springs 62 as elastically deformable members to control the degree of torque acting on the pinion side rotor 30c5 which, as described above, permits the outer gear 28 to rotate relative to the carrier shaft 30c, so that the planet gears 26, as illustrated in FIG. 3(b), rotate. Specifically, each of the upright walls (i.e., the protrusions) 56b is disposed in one of the holding recesses 59a and undergoes a restoring force, as produced by the spring 62, from the downstream side to the upstream side in the direction in which the planetary side rotor 30c4 and the pinion side rotor 30c5 rotate when the pinion side rotor rotates 30c5 relative to the planetary side rotor 30c4. The coil springs 62 are insensitive to thermal aging, thus improving the stability in transmitting torque between the planetary side rotor 30c4 and the pinion side rotor 30c5.

Sixth Embodiment

Figure 17A:
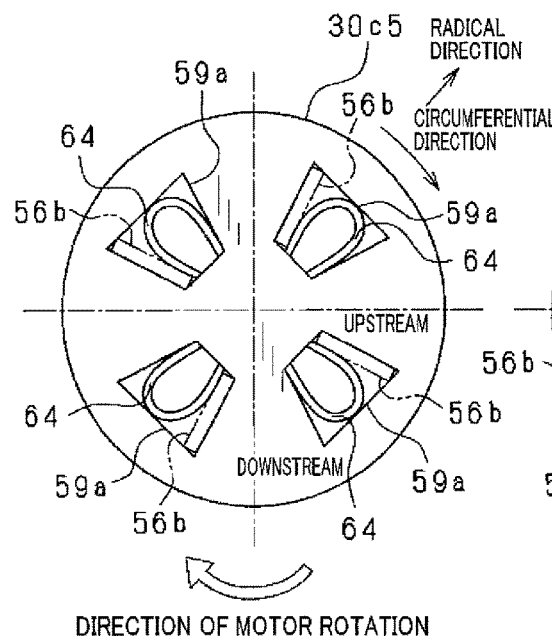
FIGS. 17(a) and 17(b) are views which illustrate a torque transmitting mechanism of a torque variator according to the sixth embodiment.
Figure 17B:
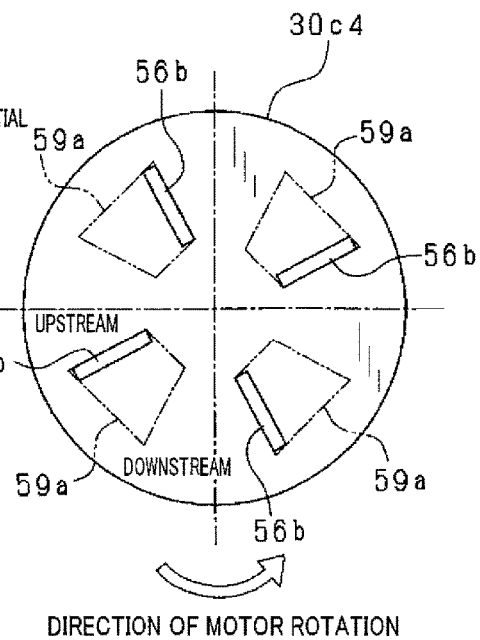

FIGS. 17(a) and 17(b) illustrate the starter 10 of the sixth embodiment which is a modification of that in the fifth embodiment. Specifically, the starter 10 has U-shaped plate springs 64 disposed in the holding recesses 59a of the pinion side rotor 30c5 instead of the coil springs 62 used in the fifth embodiment. The same reference numbers as employed in FIGS. 16(a) and 16(b) will refer to the same parts, and explanation thereof in detail will be omitted here.

Like the fifth embodiment, the upright walls 56b of the planetary side rotor 30c4 are pressed at all the time by the plate springs 64, respectively, from the downstream side to the upstream side in the direction of rotation of the motor 12. The starter 10 of this embodiment offers the same beneficial advantages as in the fifth embodiment.

Seventh Embodiment

The starter 10 of the seventh embodiment will be described below which is different in structure of a variable speed reducer (also called a torque variator) from the fourth embodiment in FIGS. 10 to 14.

Figure 18:
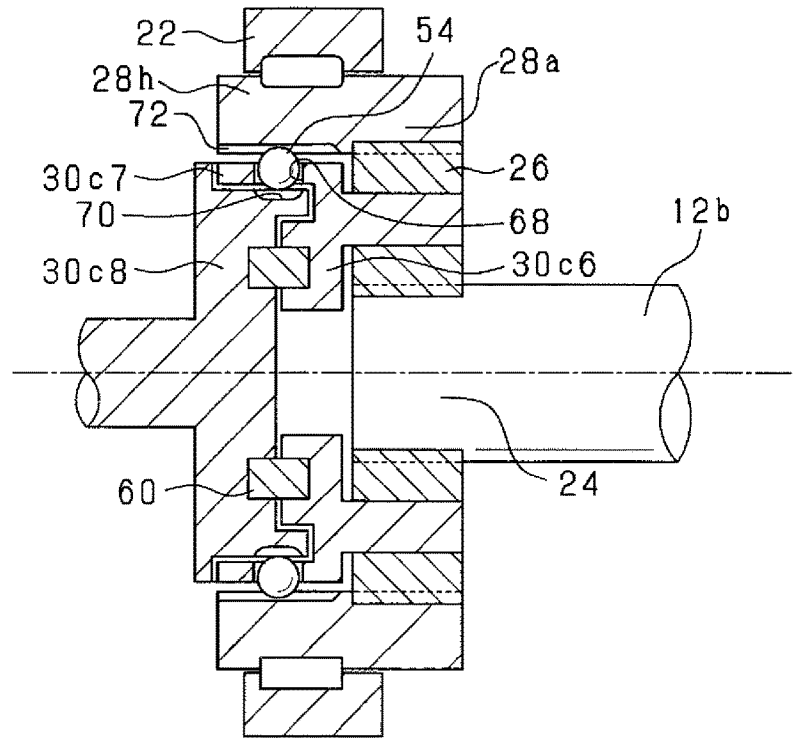
FIG. 18 is a traverse section which illustrates a torque transmitting mechanism of a torque variator installed in a starter according to the seventh embodiment.
Figure 19:
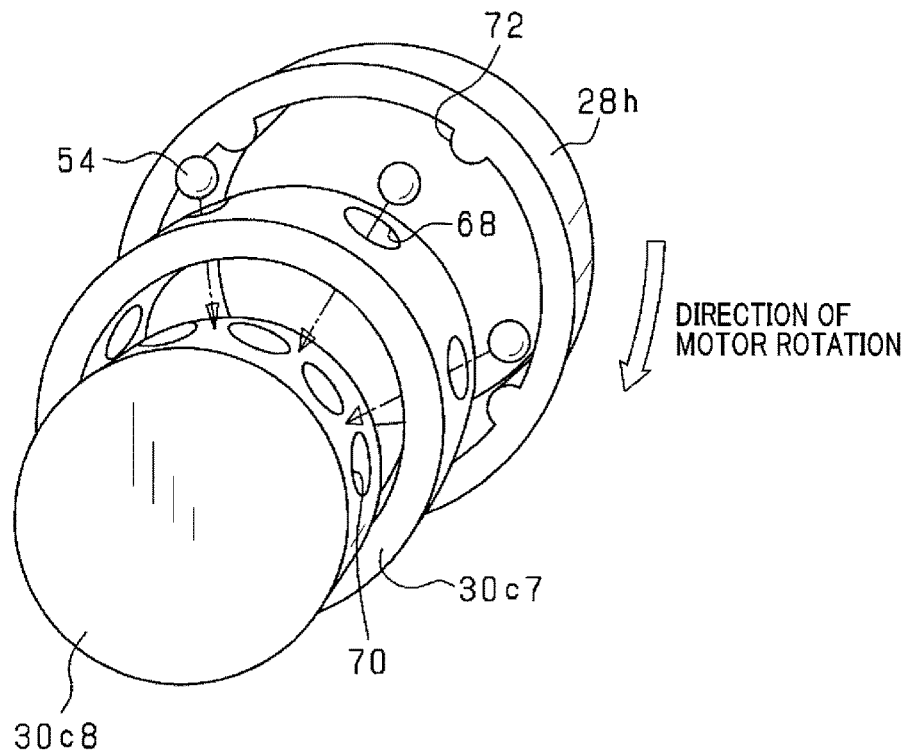
FIG. 19 is a perspective view which illustrates a torque variator of the starter of FIG. 18.

FIGS. 18 and 19 illustrate the starter 10 of the seventh embodiment. The same reference numbers as employed in FIGS. 10 to 14 will refer to the same parts, and explanation thereof in detail will be omitted here.

The carrier shaft 30c includes the planetary side rotor 30c6 (which will also be referred to as a first rotor) and the pinion side rotor 30c8 (which will also be referred to as a second rotor). The planetary side rotor 30c6 is joined at an end thereof facing the motor 12 to the pins 30b. The pinion side rotor 30c8 is made of a discrete member separate from the planetary side rotor 30c6. The pinion side rotor 30c8 is connected to the pinion gear 20 through the overrunning clutch 18. The center axis of the planetary side rotor 30c6 and the center axis of the pinion side rotor 30c8 are aligned with the center axis of the carrier shaft 30c, as indicated by a dashed line in FIG. 18.

The planetary side rotor 30c6 has a planetary side fastener 30c7 which extends from the outer circumference thereof to outside the outer circumference of the pinion side rotor 30c8. The planetary side fastener 30c7 is made of a hollow cylinder formed integrally with the planetary side rotor 30c6 and will also be referred to as an outer ring. The outer gear 28 is equipped with the toothed portion 28a and the clutch contacting portion 28h formed integrally with the toothed portion 28a. The clutch contacting portion 28g is hollow cylindrical and located closer to the pinion gear 20 than the toothed portion 28a is in the axial direction of the starter 10.

The clutch contacting portion 28h is disposed to have an outer periphery placed in contact with rollers of the one-way clutch 22. In this disclosure, one of the planetary side rotor 30c6 and the pinion side rotor 30c8 which faces the inner circumferential surface of the outer gear 28 and has the outer ring (i.e., the planetary side fastener 30c7) extending in the axial direction of the planetary side rotor 30c6 and the pinion side rotor 30c8 is defined as the first rotor, and one of the planetary side rotor 30c6 and the pinion side rotor 30c8 which is disposed inside the inner circumference of the outer ring (i.e., the planetary side fastener 30c7) is defined as the second rotor.

The clutch contacting portion 28h of the outer gear 28, as clearly illustrated in FIGS. 18 and 19, has formed on an inner periphery thereof a plurality of protrusions 72 formed on an inner periphery thereof in the form of a U-shaped ridge. The protrusions 72 bulge inwardly in the radial direction of the clutch contacting portion 28h and arranged at equal intervals away from each other in the circumferential direction of the clutch contacting portion 28h. The planetary side fastener 30c7 (i.e., the outer ring) has a plurality of circular through holes 68 formed therein. Specifically, each of the holes 68 passes through the planetary side fastener 30c7 in a radial direction of the planetary side fastener 30c7, in other words, passes through the thickness of the planetary side fastener 30c7. The holes 68 are arranged at equal intervals away from each other in the circumferential direction of the planetary side fastener 30c7. The holes 68 are shaped to have a diameter greater than that of the steel balls 54 so that the steel balls 54 are permitted to pass through the holes 68. The pinion side rotor 30c8 has a plurality of ball retainers 70 formed in the outer periphery thereof facing the planetary side fastener 30c7 in the shape of a domed concave bore or recess. The ball retainers 70 are arranged at equal intervals away from each other in the circumferential direction of the planetary side fastener 30c7. The ball retainers 70 and the protrusions 72 are identical in number with the through holes 68.

The operation of the starter 10 of this embodiment will be described below with reference to FIGS. 20(a) and 20(b).

Figure 20:
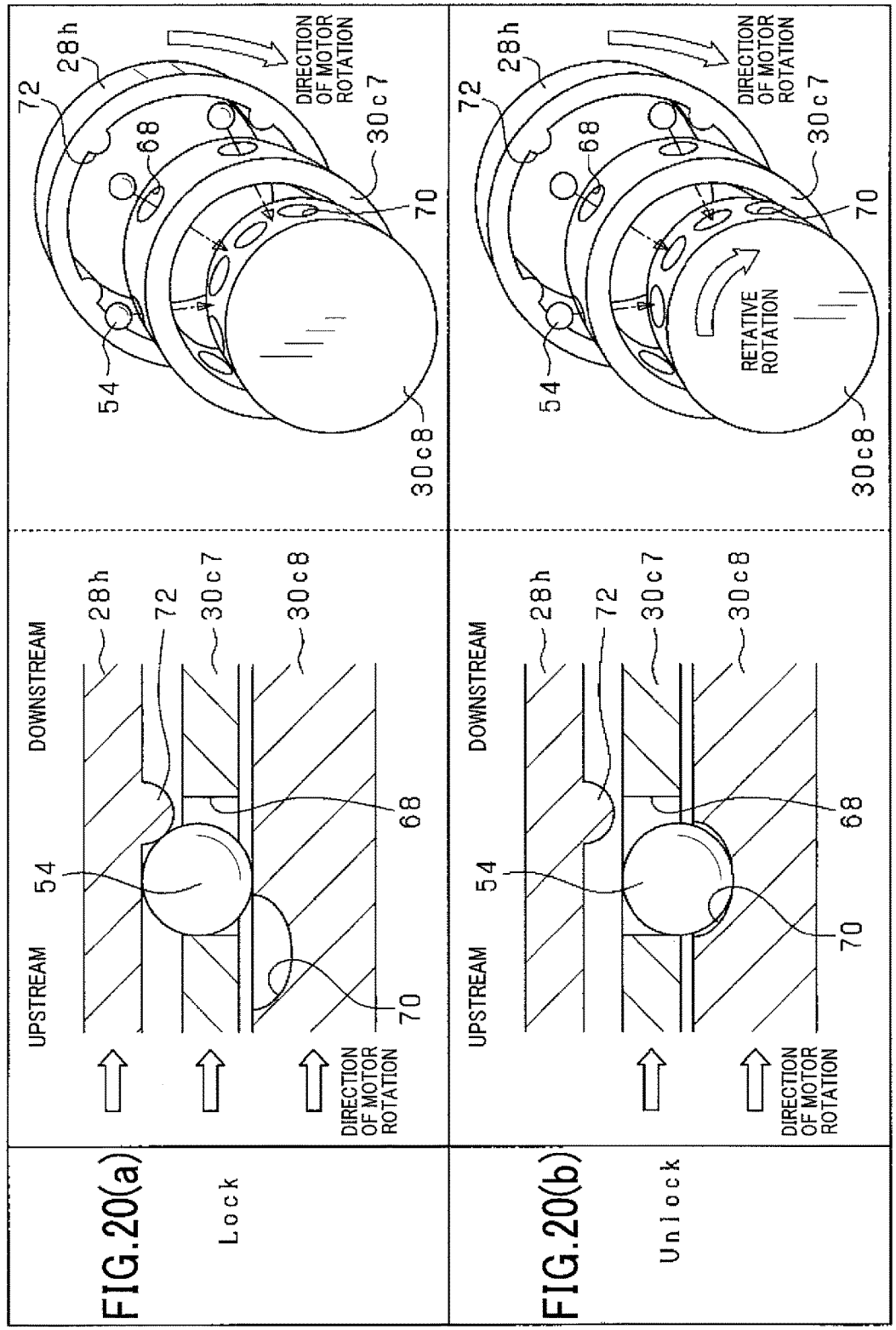
FIGS. 20(a) and 20(b) are views which illustrate operations of the starter of FIG. 18 in the seventh embodiment.

When the torque acting on the pinion side rotor 30c8 is low, the amount by which the planetary side rotor 30c6 rotates relative to the pinion side rotor 30c8, as illustrated in FIG. 20(a), will be small or zero. The steel balls 54 are pressed by the planetary side fastener 30c7 from the upstream side to the downstream side in the direction of rotation of the motor 12 against the protrusions 72. This achieves a mechanical connection or lock between the clutch contacting portion 28h and the planetary side fastener 30c7 through the steel balls 54. This causes the sun gear 24, the carrier shaft 30c, and the outer gear 28 to rotate together, thus achieving a speed reduction ratio of one in the planetary gear train 16.

When the torque acting on the pinion side rotor 30c8 exceeds a given level, the planetary side rotor 30c6 (i.e., the planetary side fastener 30c7) is, as illustrated in FIG. 20(b), shifted by a given angle away from the pinion side rotor 30c8, in other words, the relative rotation amount by which the pinion side rotor 30c8 rotates relative to the planetary side rotor 30c6 will be greater than or equal to the given value. This causes each of the steel balls 54 to drop down into one of the ball retainers 70, thereby unlocking the clutch contacting portion 28h from the planetary side rotor 30c6 and the pinion side rotor 30c8. This permits the outer gear 28 to rotate relative to the carrier shaft 30c, so that the planet gears 26 rotate. The one-way clutch 22, as described above, holds the outer gear 28 from rotating in the reverse direction, thus fixing the speed reduction ratio of the planetary gear train 16 to a given value greater than one.

The structure of the starter 10 of this embodiment offers the advantage that it is possible to make the mechanism change the speed reduction ratio of the planetary gear train 16 simply at a decreased cost. This is accomplished with machining or drilling the through holes 68.

Eighth Embodiment

Figure 21:
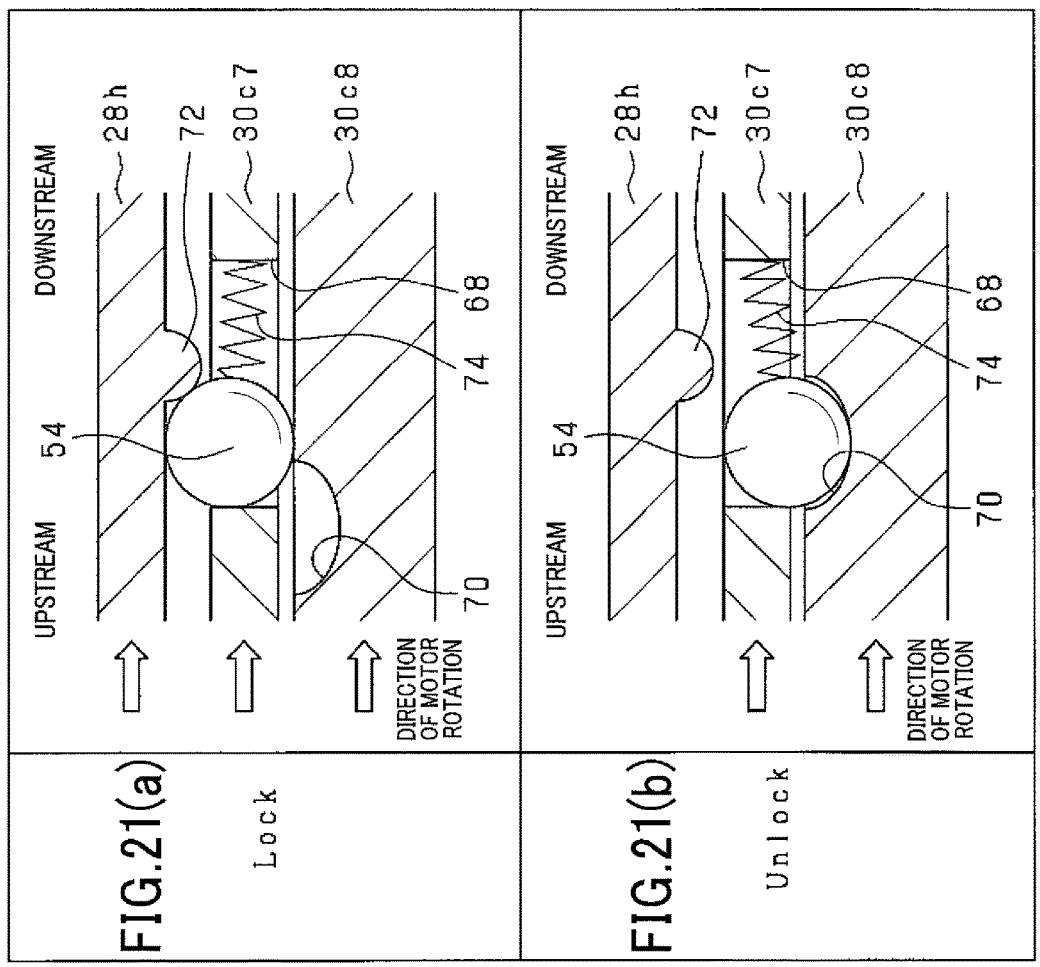
FIGS. 21(a) and 21(b) are sectional views which illustrate a torque transmitting mechanism of a torque variator installed in a starter according to the eighth embodiment.

The starter 10 of the eighth embodiment will be described below with reference to FIGS. 21(a) and 21(b) which is a modification of that of the seventh embodiment. The starter 10 is equipped with coil springs 74 each of which connects one of the steel balls 54 with the planetary side fastener 30c7. Specifically, each of the coil springs 74 joints one of the steel balls 54 to a downstream portion of the inner wall of a corresponding one of the through holes 68 in the direction of rotation of the planetary side rotor 30c6 and the pinion side rotor 30c8 (i.e., the motor 12). The same reference numbers in FIGS. 21(a) and 21(b) as employed in FIGS. 20(a) and 20(b) will refer to the same parts, and explanation thereof in detail will be omitted here.

In operation, when the carrier shaft 30c is rotating, it will cause the centrifugal force to act on the steel balls 54. When the lock of the clutch contacting portion 28h and the pinion side rotor 30c8 is, as illustrated in FIG. 21(b), released, the centrifugal force exerted on the steel balls 54 will result in instability in motion of the steel balls 54 within a chamber defined by the clutch contacting portion 28h and the pinion side rotor 30c8. For instance, the steel balls 54 impact the clutch contacting portion 28h, thus generating mechanical noise or mechanical wear of the steel balls 54 and the clutch contacting portion 28h. The coil springs 74 serve to alleviate such problems. Specifically, each of the coil springs 74 works to elastically attract or urge the steel ball 54 into contact abutment with the edge of the ball retainer 70 to ensure the stability in motion of the steel ball 54.

Ninth Embodiment

Figure 22:
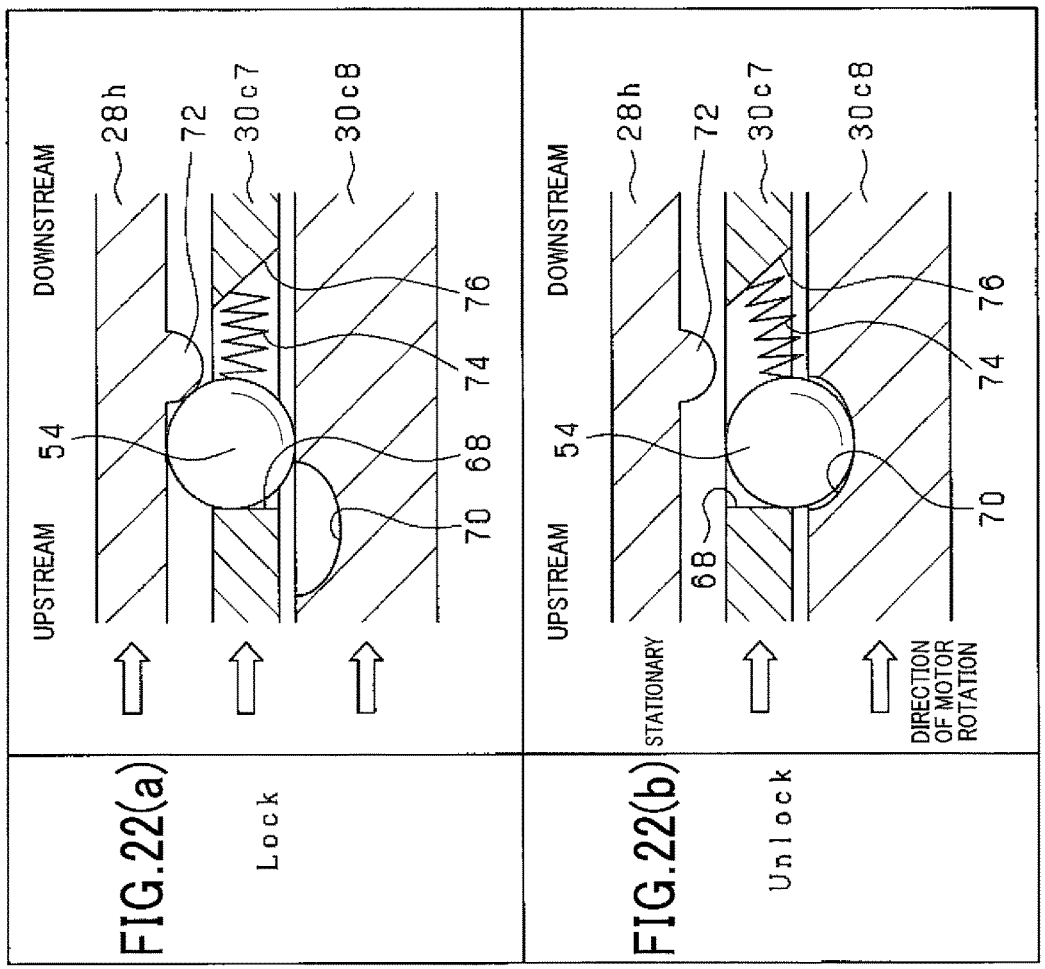
FIGS. 22(a) and 22(b) are sectional views which illustrate a torque transmitting mechanism of a torque variator installed in a starter according to the ninth embodiment.

FIGS. 22(a) and 22(b) illustrate the starter 10 of the ninth embodiment which is a modification of the eighth embodiment. The planetary side fastener 30c7 of the planetary side rotor 30c6 has the through holes 68 formed therein. Each of the holes 68 has a slant surface 76 defined by a portion of the inner wall thereof which is located on the downstream side in the direction of rotation of the motor 12. The slant surface 76 is oriented inwardly in the radial direction of the planetary side rotor 30c6, in other words, faces the pinion side rotor 30c8, thereby inclining the coil spring 74 inwardly in the radial direction f the planetary side rotor 30c6. The same reference numbers in FIGS. 22(a) and 22(b) as employed in FIGS. 21(a) and 21(b) will refer to the same parts, and explanation thereof in detail will be omitted here.

In operation, when the torque acting on the pinion side rotor 30c8 exceeds the given level, so that each of the steel balls 54 drops down into one of the ball retainers 70, the restoring force created by the coil spring 74, like the structure of the eighth embodiment, acts on the steel ball 54, but a component of the restoring force in a direction of the centrifugal force exerted on the steel ball 54 will be small as compared with the eighth embodiment. This further enhances the stability in motion of the steel balls 54.

Tenth Embodiment

Figure 23:
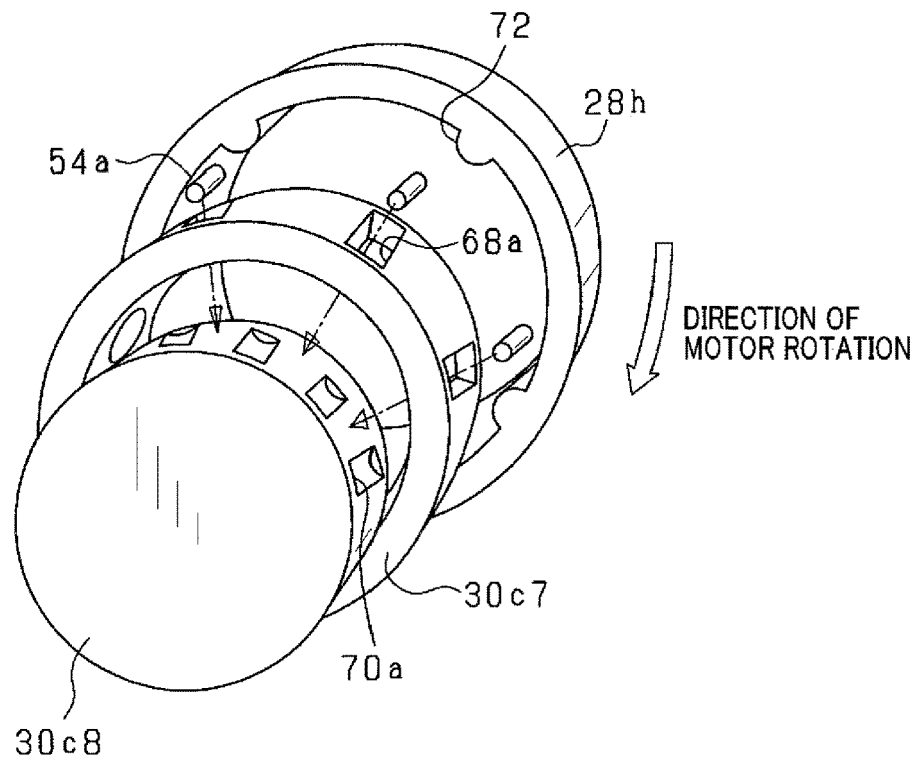
FIG. 23 is a perspective view which illustrates a torque variator of a starter according to the tenth embodiment.

The starter 10 of the tenth embodiment will be described below with reference to FIG. 23 which is a modification of that in the seventh embodiment in FIGS. 18 and 19. Specifically, the starter 10 of this embodiment is equipped with cylindrical rollers 54a instead of the steel balls 54. The same reference numbers in FIG. 23 as employed in FIGS. 18 and 19 will refer to the same parts, and explanation thereof in detail will be omitted here.

The planetary side fastener 30c7 has a plurality of rectangular through holes 68a formed therein. The holes 68a are arranged at equal intervals away from each other in the circumferential direction of the planetary side fastener 30c7. The holes 68a are shaped to have a size great enough to make the rollers 54a pass therethrough. The pinion side rotor 30c8 has a plurality of roller retainers 70a formed in the outer periphery thereof facing the planetary side fastener 30c7 in the shape of a semicircular concave bore or groove contoured to retain the rollers 54a therein. The roller retainers 70a are arranged at equal intervals away from each other in the circumferential direction of the planetary side fastener 30c7. The roller retainers 70a and the protrusions 72 are identical in number with the through holes 68a.

The operation of the starter 10 of this embodiment will be described below.

When the torque acting on the pinion side rotor 30c8 is low, the rollers 54a, like in the seventh embodiment, are pressed by the planetary side fastener 30c7 against the protrusions 72, thereby achieving a mechanical connection or lock between the clutch contacting portion 28h and the planetary side fastener 30c7 through the rollers 54a. This causes the sun gear 24, the carrier shaft 30c, and the outer gear 28 to rotate together, thus achieving a speed reduction ratio of one in the planetary gear train 16.

When the torque acting on the pinion side rotor 30c8 exceeds a given level, each of the rollers 54s drops down into one of the roller retainers 70a, thereby unlocking the clutch contacting portion 28h from the planetary side rotor 30c6 and the pinion side rotor 30c8. This permits the outer gear 28 to rotate relative to the carrier shaft 30c, so that the planet gears 26 rotate. The one-way clutch 22, as described above, holds the outer gear 28 from rotating in the reverse direction, thus fixing the speed reduction ratio of the planetary gear train 16 to a given value greater than one.

Eleventh Embodiment

Figure 24:
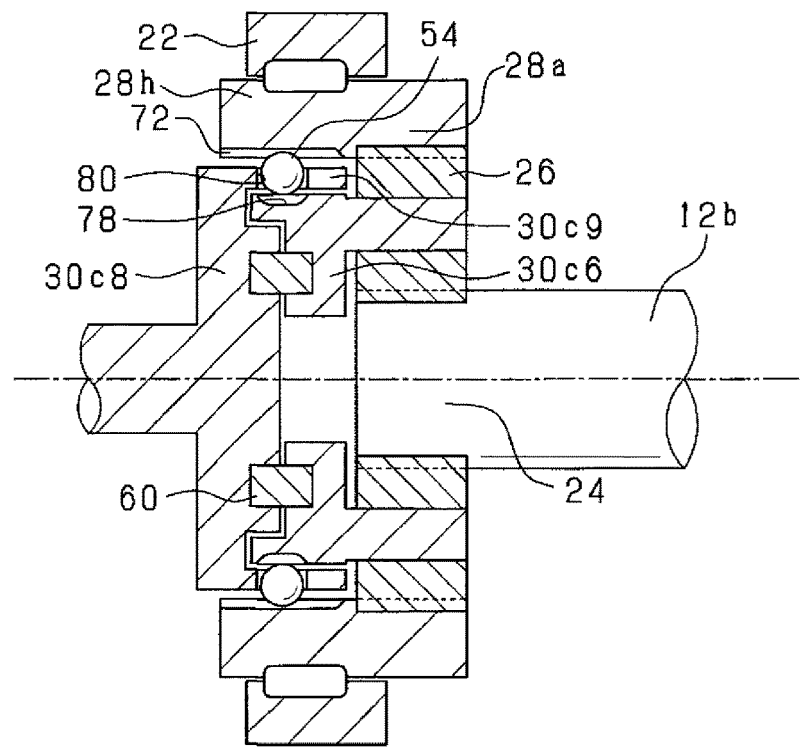
FIG. 24 is a traverse section which illustrates a one-way clutch installed in a starter according to the eleventh embodiment.

The starter 10 of the eleventh embodiment will be described below which is different in structure of a one-way clutch from the seventh embodiment in FIGS. 18 and 19. FIG. 24 illustrates the starter 10 of the eleventh embodiment. The same reference numbers as employed in FIGS. 18 and 19 will refer to the same parts, and explanation thereof in detail will be omitted here.

The carrier shaft 30c includes the pinion side rotor 30c8 (which will also be referred to as a first rotor) and the planetary side rotor 30c6 (which will also be referred to as a second rotor). The pinion side rotor 30c8 has a pinion side fastener 30c9 which extends from the outer circumference thereof to outside the outer circumference of the planetary side rotor 30c6. The pinion side fastener 30c9 is made of a hollow cylinder formed integrally with the pinion side rotor 30c8 and will also be referred to as an outer ring. The pinion side fastener 30c9 has a plurality of circular through holes 80 formed therein. The holes 80 are arranged at equal intervals away from each other in the circumferential direction of the pinion side fastener 30c9. The holes 80 are shaped to have a diameter greater than that of the steel balls 54. The planetary side rotor 30c6 has a plurality of ball retainers 78 formed in the outer periphery thereof facing the pinion side fastener 30c9 in the shape of a domed concave bore or recess. The ball retainers 78 are arranged at equal intervals away from each other in the circumferential direction of the pinion side fastener 30c9. The ball retainers 78 and the protrusions 72 are identical in number with the through holes 80. In this disclosure, one of the planetary side rotor 30c6 and the pinion side rotor 30c8 which faces the inner circumferential surface of the outer gear 28 and has the outer ring (i.e., the planetary side fastener 30c9) extending in the axial direction of the planetary side rotor 30c6 and the pinion side rotor 30c8 is defined as the first rotor, and one of the planetary side rotor 30c6 and the pinion side rotor 30c8 which is disposed inside the inner circumference of the outer ring (i.e., the planetary side fastener 30c9) is defined as the second rotor. The operation of the starter 10 of this embodiment is substantially identical with that in the seventh embodiment, as already discussed with reference to FIGS. 20(a) and 20(b), and explanation thereof in detail will be omitted here.

Twelfth Embodiment

Figure 25:
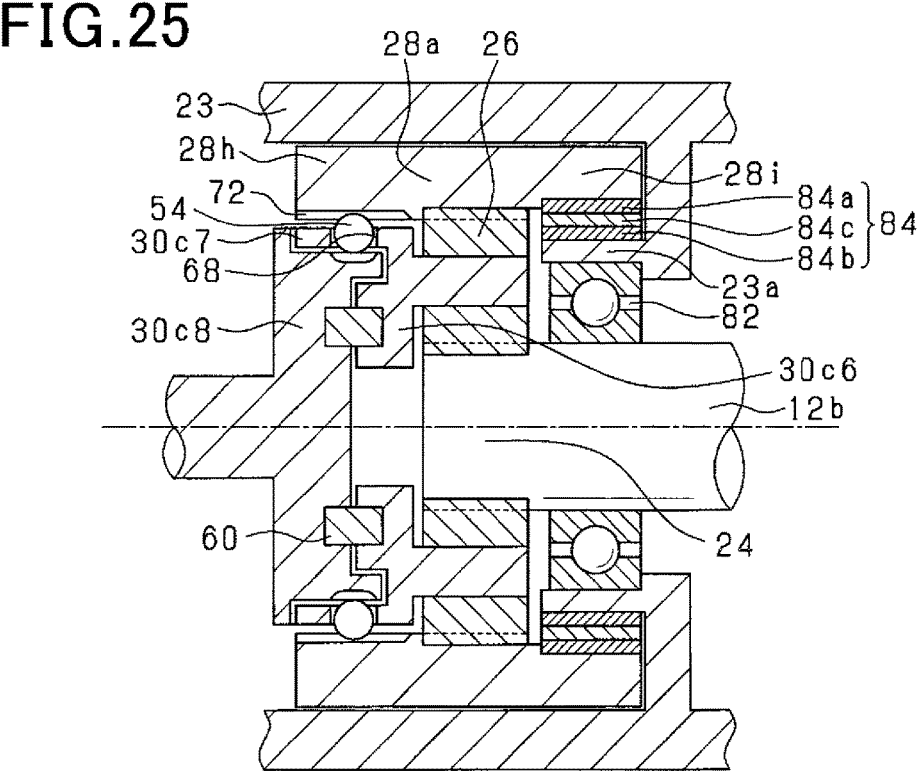
FIG. 25 is a traverse section which illustrates a one-way clutch installed in a starter according to the twelfth embodiment.

The starter 10 of the twelfth embodiment will be described below which is different in structure of a one-way clutch from the seventh embodiment in FIGS. 18 and 19. FIG. 25 illustrates the starter 10 of the twelfth embodiment. The same reference numbers as employed in FIGS. 18 and 19 will refer to the same parts, and explanation thereof in detail will be omitted here.

The outer gear 28 is, as illustrated in FIG. 25, equipped with an annular clutch contacting portion 28i which extends from the toothed portion 28a toward the motor 12 in the axial direction of the starter 10. In other words, the clutch contacting portion 28i is disposed adjacent the toothed portion 28a in the axial direction of the outer gear 28 and closer to the motor 12 than the planet gears 26 are. The clutch contacting portion 28i is of a hollow cylindrical shape.

The one-way clutch 84 is equipped with an outer race 84a, an inner race 84b, and a plurality of cams 84c. The outer race 84a is secured to an inner circumference of the clutch contacting portion 28i. The inner race 84b is secured to an outer circumference of a bearing retainer 23a of the housing 23. The bearing retainer 23a is disposed closer to the motor 12 than the planet gears 26 are. The bearing retainer 23a is of a hollow cylindrical shape and formed integrally with the housing 23. For instance, the housing 23 and the bearing retainer 23a are formed by machining or cutting a one-piece cast block.

The one-way clutch 84 has the following function in addition to that of the one-way clutch 22, as described in the first embodiment. When the rotational speed of the motor 12 is lower than a given value, the one-way clutch 84 works to lock the outer race 84a and the inner race 84b through the cams 84c. When the speed of the motor 12 exceeds the given value, the cams 84c undergo the centrifugal force, so that they are moved out of contact with the inner race 84b. The one-way clutch 84 is of the so-called disengage type.

The one-way clutch 84 is also equipped with a wire cage and a garter spring (not shown). The wire cage is a retainer to arrange the cams 84 at equal intervals away from each other in the circumferential direction of the one-way clutch 84. The garter spring is a mechanism working to exert pressure on the cams 84c into contact with the outer race 84a and the inner race 84b.

The armature shaft 12b is retained by a shaft bearing 82 to be rotatable. The shaft bearing 82 is secured to the inner circumference of the bearing retainer 23a. Specifically, the shaft bearing 82 is located so as to overlap with the one-way clutch 84 in the radial direction of the shaft bearing 82.

Figure 26A:
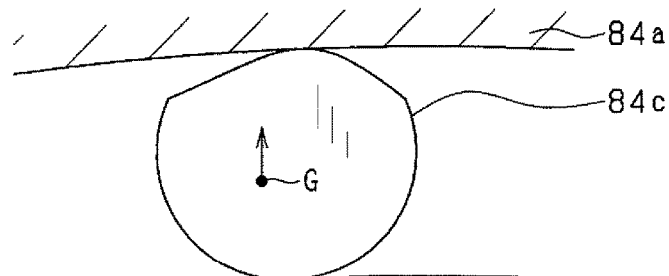
FIGS. 26(a) and 26(b) are views which illustrate an operation of the one-way clutch of FIG. 15.
Figure 26B:
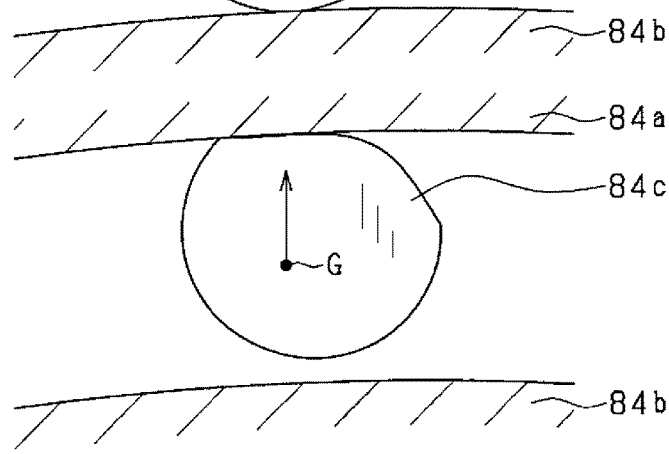

The operation of the one-way clutch 84 will be described below with reference to FIGS. 26(a) and 26(b). In FIGS. 26(a) and 26(b), "G" represents the center of gravity of the cam 84c.

When the outer gear 28 is rotating in the normal direction, and the speed of the motor 12 is lower than a given value, the moment which is centered at a contact between the cam 84c and the outer race 84a and arises from the centrifugal force acting on the cam 84c (which will also be referred to as a centrifugal moment below) is lower than the moment which is exerted by the garter spring on the cam 84c into constant contact with the outer race 84a and the inner race 84b (which will also be referred to as a restoring moment below). This places, as illustrated in FIG. 26(a), the cam 84c in mechanical contact with the outer race 84a and the inner race 84b to achieve a mechanical connection between the outer race 84a and the inner race 84b.

When the outer gear 28 is rotating in the normal direction, and the speed of the motor 12 exceeds the given value, the centrifugal moment increases above the restoring moment. This causes, as illustrated in FIG. 26(b), the cam 84c to be lifted up from the inner race 84b, so that the cam 84c is placed in non-contact with the inner race 84b.

As apparent from the above discussion, the cams 84c are disposed out of contact with the inner race 84b to achieve a speed reduction ratio of one in the planetary gear train 16. This minimizes the mechanical noise arising from the operation of the starter 10 and improves the durability of the starter 10.

The shaft bearing 82 is secured to the inner circumference of the bearing retainer 23a so as to overlap with the one-way clutch 84 in the radial direction of the shaft bearing 82. This improves the utilization of the inner space of the housing 23 and permits the starter 10 to be reduced in size thereof.
Modifications The starter 10 of each of the above embodiments may be modified in the following ways.

Figure 27:
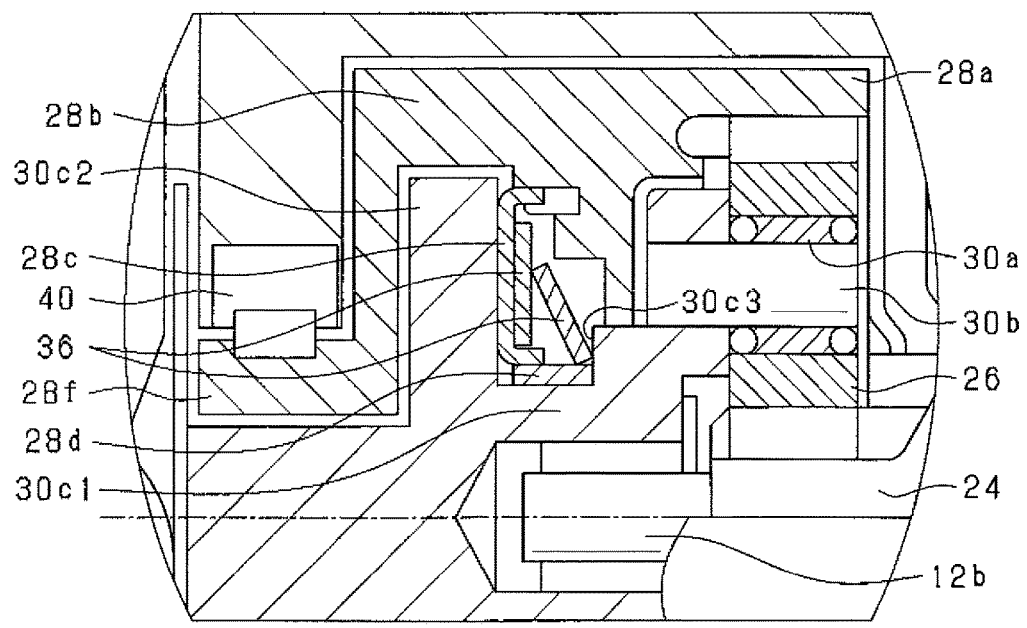
FIG. 27 is a traverse section which a modified form of a starter.

The location of the one-way clutch 22 is not limited to the one in the first embodiment. For instance, the starter 10 may alternatively have, as illustrated in FIG. 27, the one-way clutch 40 located closer to the center axis (i.e., the longitudinal center line) of the starter 10 than the one-way clutch 22 is. The same reference numbers in FIG. 27 as employed in FIGS. 1 and 2 refer to the same parts. The one-way clutch 40 of FIG. 27 is placed in contact with a portion 28f of the outer gear 28 which extends from the end of the toothed portion 28a toward the pinion gear 20 in the axial direction of the starter 10. This arrangement results in a decrease in circumferential speed of the portion 28f of the outer bear 28 with which the one-way clutch 40 contacts and improves the reliability in operation of the one-way clutch 40.

The electromagnetic clutch in the second embodiment may alternatively have the exciting coil 38a and the housing 38b disposed closer to the outer gear 28 and the clutch plate 28e disposed closer to the carrier shaft 30c.

The starter 10 of the first embodiment has the outer gear side contacting portion 28c and the carrier side contacting portion 30c2 pressed against each other in the axial direction of the starter 10, but may alternatively be designed to have them pressed against each other in a direction perpendicular to the axial direction (i.e., the radial direction of the starter 10).

The spring mechanism 36 works as a pressing member to elastically press the outer gear side contacting portion 28c against the carrier side contacting portion 30c2, but another type of elastically deformable member or elastically undeformable member may alternatively be used as long as it functions to urge the outer gear side contacting portion 28c the carrier side contacting portion 30c2 into contact abutment with each other.

The ball-holding grooves 50a of the starter 10 in the fourth embodiment may alternatively be formed only in the planetary side rotor 30c4 or both in the planetary side rotor 30c4 and the pinion side rotor 50c5.

In the fourth embodiment, either one of the holding recesses 56a of the planetary side rotor 30c4 and the holding recesses 58a of the pinion side rotor 30c5 may be omitted. In this case, the length of the rubber members 60 in the axial direction of the starter 10 is decreased by, for example, the depth of the holding recesses 56a or 58a. Both the holding recesses 56a and the holding recesses 58a may alternatively be omitted. In this case, each of the rubber members 60 is held tightly in place by the upright walls 56b and 58b. The upright walls 58b of the pinion side rotor 30c5 may also be omitted.

The rubber members 60 used in the fourth embodiment may alternatively be shaped to be rectangular parallelepiped or cylindrical.

Instead of the coil springs 62 or the plate springs 64 used in the fifth or sixth embodiment, flat spiral springs may be used. Specifically, it is necessary for the starter 10 to have a spring mechanism to urge the upright walls 56b in the circumferential direction of the pinion side rotor 30c5. The planetary side rotor 30c4 in the fifth or sixth embodiment may alternatively be designed to have the holding recesses 56a in which springs are disposed, while the pinion side rotor 30c5 may have the upright walls 56b formed thereon in the form of protrusions biased or pressed by the springs.

The coil springs 74 used in the eighth and ninth embodiments may also be used as elastically retaining the rollers 54a in the tenth embodiment.

Figure 10:
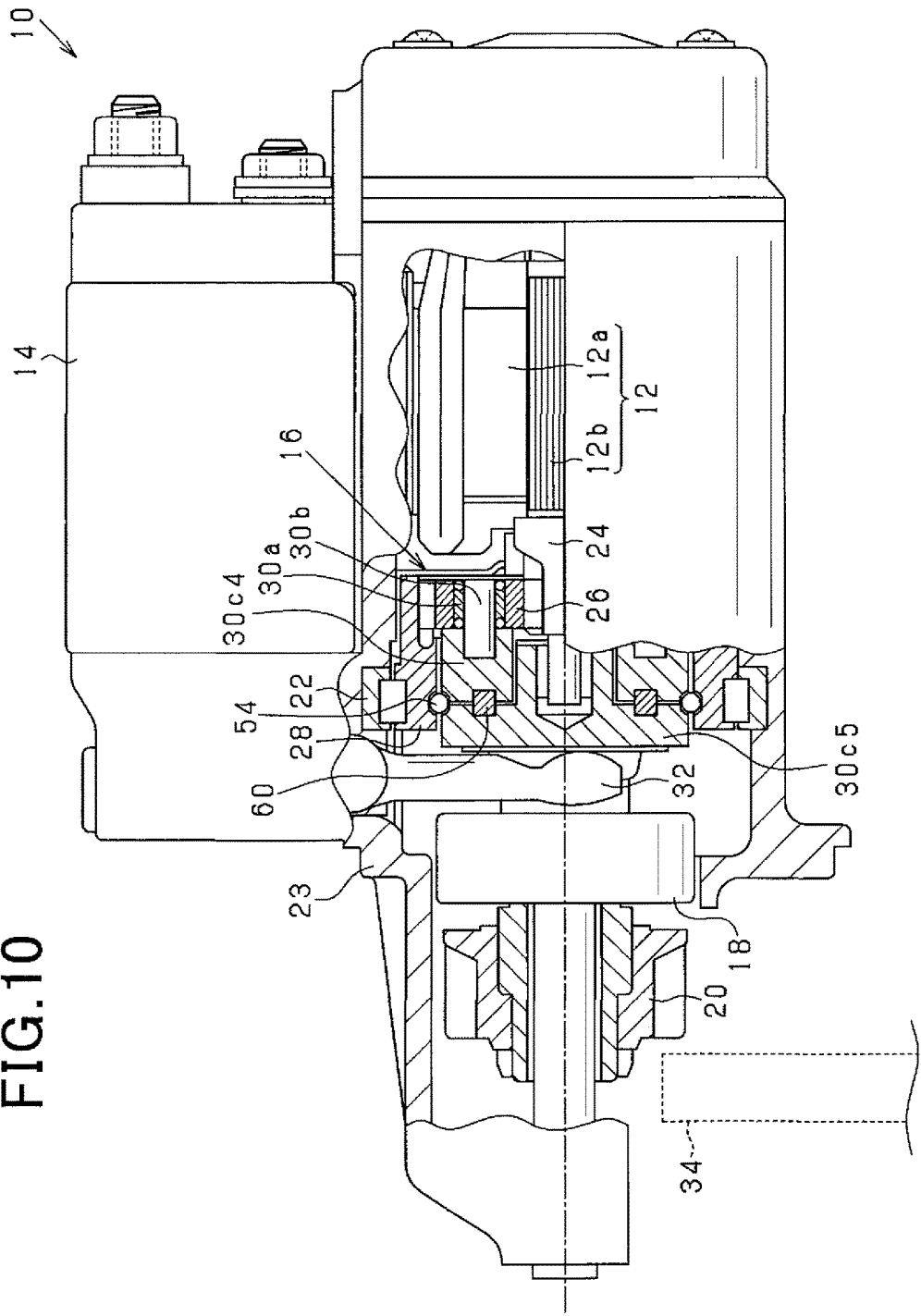
FIG. 10 is a partially cross sectional view which shows the structure of a starter for an engine according to the fourth embodiment.

The structure of the twelfth embodiment, as illustrated in FIGS. 25 and 26, may be used in the fourth embodiment in FIG. 10.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:
1. A starter for an engine comprising:
a motor which works to produce torque when electrically energized;
a planetary gear train which includes a sun gear installed on an output shaft of the motor, planet gears meshing with the sun gear, an outer gear meshing with the planet gears, and a planetary carrier retaining the planet gears to be rotatable, the planetary gear train being responsive to input of the torque produced by the motor to output torque from the planetary carrier;
a pinion gear which meshes with a ring gear of an engine and works to transmit the torque, as outputted from the planetary carrier, to the ring gear to start the engine;
a one-way clutch which permits the outer gear to rotate in a first direction in which the sun gear rotates when the motor rotates to exert the torque on the ring gear for starting the engine and inhibits the outer gear from rotating in a second direction opposite the first direction; and a torque variator that selectively operates in one of an active and an inactive mode, wherein when the outer gear is permitted by the one-way clutch to rotate to cause the outer gear and the planetary carrier to rotate together, the inactive mode is entered to establish transmission of the torque from the motor to the pinion gear, and when the outer gear is inhibited by the one-way clutch from rotating, the active mode is entered to increase the torque transmitted from the motor to the pinion gear.

2. The starter as set forth in claim 1, wherein the outer gear and the planetary carrier are disposed coaxially with each other, wherein the planetary carrier includes a planetary side rotor, a pinion side rotor, and a torque transmitting mechanism, the planetary side rotor connecting with pins which retain the planet gears to be rotatable and being arranged coaxially with the planetary gear, the pinion side rotor being disposed to have a center axis aligned with a center axis of the planetary side rotor and connecting with the pinion gear, the torque transmitting mechanism working to transmit torque from the planetary side rotor to the pinion side rotor and being disposed between the planetary side rotor and the pinion side rotor so that a difference occurs between torque acting on the planetary side rotor and torque acting on the pinion side rotor, thereby causing the pinion side rotor to rotate relative to the planetary side rotor, wherein the outer gear is of a hollow cylindrical shape, wherein the planetary side rotor and the pinion side rotor are disposed inside an inner circumference of the outer gear, and wherein the torque variator includes a locking-unlocking mechanism which serves to lock the planetary carrier and the outer gear when a relative rotation amount by which the pinion side rotor rotates relative to the planetary side rotor is lower than a given value and unlock the planetary carrier and the outer gear when the relative rotation amount is greater than or equal to the given value.

3. The starter as set forth in claim 2, wherein the torque transmitting mechanism includes an elastically deformable member and protrusions, the elastically deformable member being disposed on a first surface that is at least one of mutually facing surfaces of the planetary side rotor and the pinion side rotor, the protrusions being disposed on a second surface that is the other of the mutually facing surfaces of the planetary side rotor and the pinion side rotor, the protrusions extending from the second surface in an axial direction of the planetary side rotor and the pinion side rotor and compressing the elastically deformable member in a circumferential direction of the planetary side rotor and the pinion side rotor.

4. The starter as set forth in claim 3, wherein the elastically deformable member is implemented by a spring held in a holding recess formed in the first surface, and wherein the protrusions are disposed in the holding recess and undergo a restoring force, as produced by the spring, from a downstream side to an upstream side in a direction in which the planetary side rotor and the pinion side rotor rotate when the pinion side rotor rotates relative to the planetary side rotor.

5. The starter as set forth in claim 3, wherein the first surface has formed therein a holding recess in which the elastically deformable member is disposed, and wherein the elastically deformable member is shaped to protrude from the first surface in an axial direction of the planetary side rotor and the pinion side rotor.

6. The starter as set forth in claim 2, wherein the locking-unlocking mechanism includes a carrier groove, a roller, and a holding groove, the carrier groove being formed in outer circumferences of the planetary side rotor and the pinion side rotor and extending over and along a boundary between the planetary side rotor and the pinion side rotor in a circumferential direction of the planetary side rotor and the pinion side rotor, the roller being of a spherical shape and disposed in the carrier groove to be rollable, the holding groove being formed in an outer circumferential surface of at least one of the planetary side rotor and the pinion side rotor, the holding groove extending in the axial direction of the pinion side rotor and the planetary side rotor continuously from a downstream side of the carrier groove in a direction of rotation of the pinion side rotor and the planetary side rotor and being shaped to hold therein the roller from crossing the boundary between the planetary side rotor and the pinion side rotor, and wherein each of the carrier groove and the holding groove has upstream and downstream depths in the direction of rotation of the planetary side rotor and the pinion side rotor, the upstream depth being smaller than the downstream depth.

7. The starter as set forth in claim 2, wherein the planetary carrier includes a first rotor and a second rotor, the first rotor being one of the planetary side rotor and the pinion side rotor which faces an inner circumferential surface of the outer gear and has an outer ring extending in an axial direction of the planetary side rotor and the pinion side rotor, the second rotor being one of the planetary side rotor and the pinion side rotor which is disposed inside an inner circumference of the outer ring, and wherein the locking-unlocking mechanism includes a roller, a through hole, a protrusion, and a recess, the roller being of one of a spherical or cylindrical shape, the through hole passing through the outer ring in a radial direction of the outer ring and being shaped to permit the roller to pass through the hole, the protrusion extending from a portion of an inner circumferential surface of the outer gear toward an outer circumferential surface of the outer ring, the recess being formed in a portion of an outer circumferential surface of the second rotor which faces an inner circumferential surface of the outer ring, the recess retaining the roller therein, and wherein the through hole and the recess are shaped so that the roller drops in the recess when the relative rotation amount is greater than or equal to the given value.

8. The starter as set forth in claim 7, wherein a spring is disposed to connect the roller and a downstream portion of an inner wall of the through hole in a direction of rotation of the planetary side rotor and the pinion side rotor.

9. The starter as set forth in claim 1, wherein the torque variator includes an outer gear side contacting portion, a carrier side contacting portion, and a pressing member, the outer gear side contacting portion being rotatable together with the outer gear, the carrier side contacting portion being rotatable together with the planetary carrier, the pressing member working to press the outer gear side contacting portion against the carrier side contacting portion.

10. The starter as set forth in claim 9, wherein the outer gear and the planetary carrier are disposed coaxially with each other, wherein the carrier side contacting portion has an annular sliding surface which is centered at a center axis of the planetary carrier and extends perpendicular to the center axis of the planetary carrier and on which the outer gear side contacting portion is slidable, the outer gear side contacting portion has an annular sliding surface which is centered at a center axis of the outer gear and extends perpendicular to the center axis of the outer gear and on which the carrier side contacting portion is slidable, and wherein the pressing member presses the annular sliding surface of the outer gear side contacting portion against the annular sliding surface of the carrier side contacting portion.

11. The starter as set forth in claim 10, wherein the outer gear includes an annular toothed portion which has formed on an inner periphery thereof an inner teeth gear which meshes with the planet gears, wherein the outer gear side contacting portion is disposed closer to the pinion gear than the toothed portion is in an axial direction of the outer gear, wherein the planetary carrier includes a center shaft which connects with pins which retain the planet gears to be rotatable and is disposed along a center axis of the planetary carrier, wherein the center shaft and the outer gear side contacting portion are disposed inside an inner circumference of the outer gear so as to define a chamber closed by the center shaft, the outer gear, and the outer gear side contacting portion, wherein the pressing member is an elastically deformable member which is disposed in a compressed state in the annular chamber, the pressing member working to exert a restoring force resulting from compression thereof on the center shaft and the outer gear side contacting portion to press the annular sliding surface of the outer gear side contacting portion against the annular sliding surface of the carrier side contacting portion.

12. The starter as set forth in claim 9, wherein when the motor is operating, and torque acting on the planetary carrier exceeds a frictional torque, the planetary gear train changes a speed reduction ratio thereof from one to a given value greater than one, the frictional torque being to occur on a surface of contact between the outer gear side contacting portion and the carrier side contacting portion and depend upon pressure exerted by the pressing member.

13. The starter as set forth in claim 1, wherein the torque variator includes an electromagnetic clutch which works to switch between a locked state in which the planetary carrier and the outer gear rotate together and an unlocked state in which the locked state is released.

14. The starter as set forth in claim 13, wherein when a speed of the engine does not reach a given value within a given reference time from when the engine is started, the electromagnetic clutch is electrically operated to switch from the locked state to the unlocked state.

15. The starter as set forth in claim 13, wherein the electromagnetic clutch is electrically controlled to establish the unlocked state for a given period of time from when the engine starts to be started and then achieve the locked state until start-up of the engine is completed.

16. The starter as set forth in claim 1, wherein the outer gear and the planetary carrier are disposed coaxially with each other, wherein the outer gear includes an annular toothed portion, an annular clutch contacting portion, and a hollow cylindrical bearing retainer, the annular toothed portion having formed on an inner periphery thereof an inner teeth gear which meshes with the planet gears, the annular clutch contacting portion being disposed adjacent the toothed portion in an axial direction of the outer gear, the bearing retainer being disposed inside an inner circumference of the clutch contacting portion in connection with a housing of the starter, wherein the one-way clutch includes an inner race, an outer race, and a cam, the inner race being secured to an outer circumference of the bearing retainer, the outer race being secured to an inner circumference of the clutch contacting portion, the cam establishing a mechanical contact with the inner race and the outer race to achieve a connection therebetween when a speed of the motor is less than a given value and creating a non-contact with the inner race when the speed of the motor exceeds the given value.

17. The starter as set forth in claim 16, wherein the bearing retainer is of an annular shape and disposed closer to the motor than the planet gears are, the clutch contacting portion being located closer to the motor than the planet gears are, and wherein a shaft bearing is disposed in connection with an inner circumference of the bearing retainer to retain the output shaft of the motor to be rotatable.

\* \* \* \* \*